United States Patent
Misselhorn

(10) Patent No.: US 10,601,209 B2
(45) Date of Patent: Mar. 24, 2020

(54) CABLE MANAGEMENT SYSTEM AND COMPONENTS THEREFOR

(71) Applicant: Ginnovest Pty Ltd, Aitkenvale (AU)

(72) Inventor: Graham Misselhorn, Aitkenvale (AU)

(73) Assignee: GINNOVEST PTY LTD, Aitkenvale (AU)

(*) Notice: Subject to any disclaimer, the term of this patent is extended or adjusted under 35 U.S.C. 154(b) by 0 days.

(21) Appl. No.: 15/507,481

(22) PCT Filed: Aug. 27, 2015

(86) PCT No.: PCT/AU2015/050501
§ 371 (c)(1),
(2) Date: Feb. 28, 2017

(87) PCT Pub. No.: WO2016/029270
PCT Pub. Date: Mar. 3, 2016

(65) Prior Publication Data
US 2017/0294766 A1    Oct. 12, 2017

(30) Foreign Application Priority Data
Aug. 29, 2014 (AU) .................. 2014903448

(51) Int. Cl.
*H02G 3/04* (2006.01)
*H02G 3/06* (2006.01)

(52) U.S. Cl.
CPC ......... *H02G 3/0468* (2013.01); *H02G 3/0616* (2013.01); *H02G 3/04* (2013.01)

(58) Field of Classification Search
CPC ..................................... H02G 3/045
See application file for complete search history.

(56) References Cited

U.S. PATENT DOCUMENTS

| 4,688,747 A | * | 8/1987 | Helmsdorfer | H02G 3/22 174/67 |
| 4,804,210 A | | 2/1989 | Hancock | |
| 4,875,871 A | * | 10/1989 | Booty, Sr. | H01R 25/162 439/209 |

(Continued)

OTHER PUBLICATIONS

Hope Industrial Systems, Inc., Industrial Monitors and Touchscreens Blog; "Configuring a Fully-Enclosed Universal Mount Monitor—Part I"; http://news.hopeindustrial.com/2011/fully-enclosed-monitor-configurations-part-i/; Feb. 23, 2011.

(Continued)

*Primary Examiner* — Hung V Ngo
(74) *Attorney, Agent, or Firm* — David B. Gornish; Eckert Seamans Cherin & Mellott, LLC

(57) ABSTRACT

A cable management system including an elongate, flexible and length adjustable tubular conduit and a pair of mounting components to mount the elongate tubular conduit relative to a surface, one mounting component attaching a first end of the elongate conduit and a second mounting component attaching a second end of the elongate conduit, wherein together the tubular conduit and the mounting components define a body through which cables can extend and the tubular conduit is attachable and detachable as required from the mounting components used to mount the cable management system relative to the surface.

20 Claims, 16 Drawing Sheets

(56) References Cited

U.S. PATENT DOCUMENTS

| | | | | |
|---|---|---|---|---|
| 5,283,393 | A * | 2/1994 | Guginsky | F16L 11/18 174/102 R |
| 6,410,852 | B1 * | 6/2002 | Schimpf | H02G 3/0468 138/121 |
| 7,651,353 | B2 * | 1/2010 | Laukhuf | H01R 13/652 439/211 |
| 7,897,870 | B1 * | 3/2011 | Gretz | H02G 3/14 174/135 |
| 8,563,876 | B1 * | 10/2013 | Gretz | H01R 13/59 174/541 |
| 8,802,985 | B2 * | 8/2014 | Lettkeman | H02G 1/00 174/66 |
| 8,975,518 | B1 * | 3/2015 | Gretz | H02G 3/086 174/50 |
| 9,318,888 | B1 * | 4/2016 | Baldwin | H02G 3/386 |
| 10,128,646 | B1 * | 11/2018 | Gretz | H02G 3/123 |
| 10,389,096 | B2 * | 8/2019 | Pistol | H02G 15/10 |
| 2002/0067591 | A1 * | 6/2002 | Tajima | H04N 5/64 361/679.21 |
| 2008/0169251 | A1 * | 7/2008 | Smith | A47B 67/00 211/26 |
| 2010/0285699 | A1 * | 11/2010 | Auray | H02G 3/0691 439/816 |
| 2011/0021066 | A1 * | 1/2011 | Squires | H01R 24/70 439/502 |
| 2012/0248764 | A1 * | 10/2012 | Ericksen | F16L 43/008 285/331 |
| 2012/0256496 | A1 * | 10/2012 | DeCosta | H02G 1/00 307/147 |
| 2014/0014408 | A1 * | 1/2014 | Milheiro | H02G 3/12 174/480 |
| 2014/0233778 | A1 * | 8/2014 | Hardiman | H04R 1/025 381/333 |

OTHER PUBLICATIONS

Hope Industrial Systems, Inc., Industrial Monitors and Touchscreens Blog; "Configuring a Fully-Enclosed Universal Mount Monitor—Part II"; http://news.hopeindustrial.com/2011/fully-enclosed-monitor-configurations-part-i/; Feb. 23, 2011.

* cited by examiner

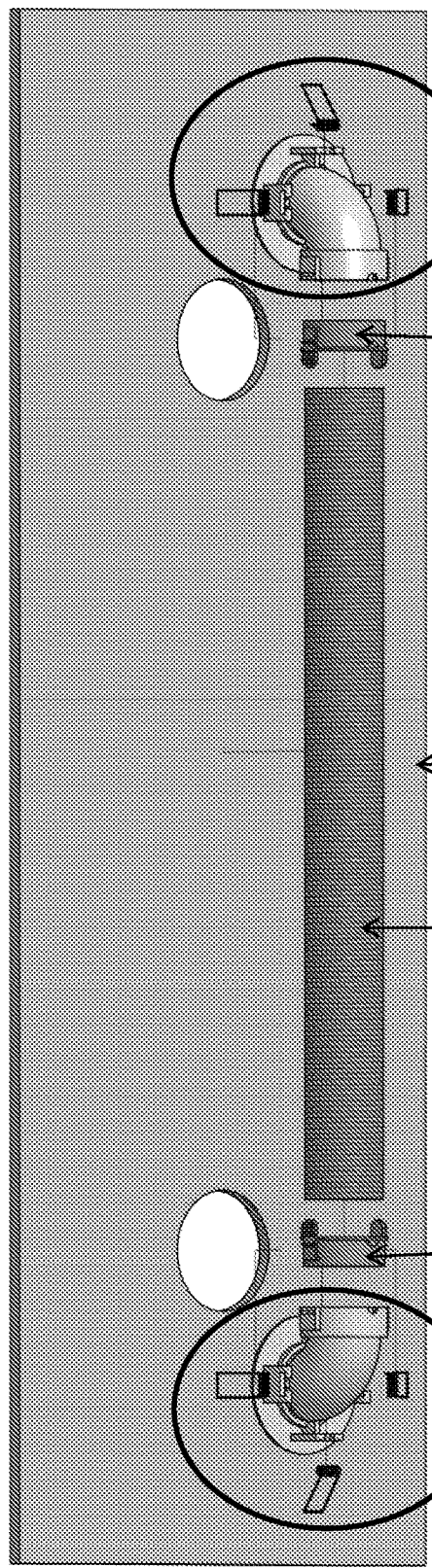
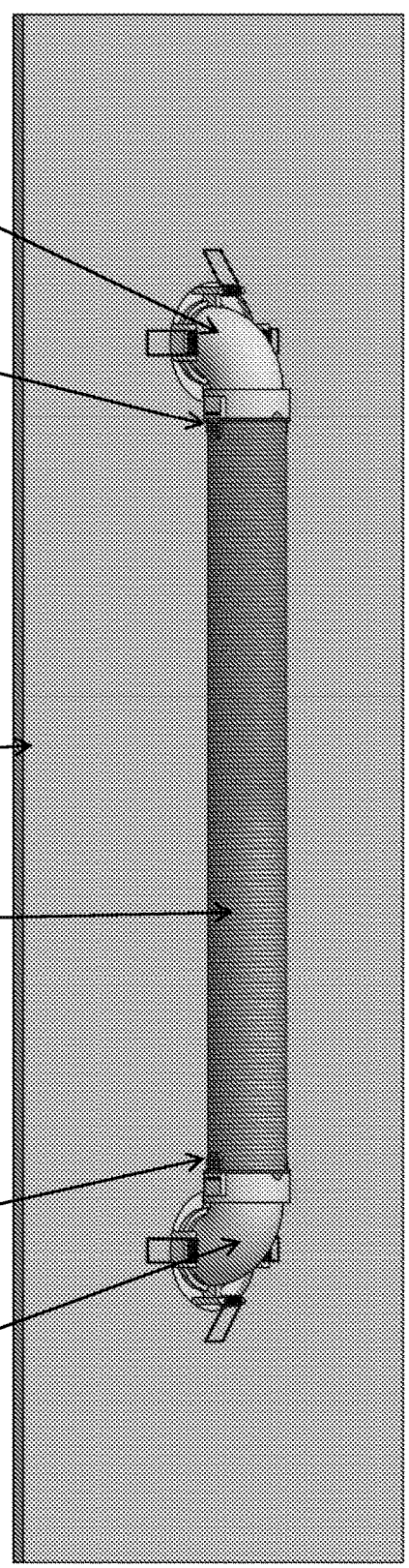
Figure 2a
Figure 2b

CABLE MANAGEMENT SYSTEM AND COMPONENTS THEREFOR

CROSS-REFERENCE TO RELATED APPLICATIONS

This application is the United States national phase of International Application No. PCT/AU2015/050501 filed Aug. 27, 2015, and claims priority to Australian Patent Application No. 2014903448 filed Aug. 29, 2014, the disclosures of which are hereby incorporated in their entirety by reference.

TECHNICAL FIELD

The present invention relates to cable management systems and particularly a cable management system for inside a wall cavity.

BACKGROUND ART

Solutions exist to hide cables in walls which require the use of fish wires or rodding devices to push/pull the cords between two holes into the wall which are then covered with a screw in cover plate afterwards. These plates need to be removed to insert a new cable.

One solution has an electrical extension between two cover plates to transfer power without feeding an electrical cable through, but still requires that cables be pulled through using fish wires.

Cables can be "hidden" by installing separate Audio Visual jack points, which television and AV cables then plug into. Jack points are interconnected by wiring in the wall cavity but terminate at each jack point.

Existing solutions all require use of fishing wires and rodding devices to pull the cables through. Most solutions need to be removed and re-installed to later pull through a new cable. No solutions provide continuous pipework behind the wall that prevents bug ingress into the wall cavity. Dust can also be a problem particularly if the wall is an external cavity wall.

Separate jackpoints introduces additional connections, each of which weakens the signals being transmitted and lowers quality. The cost of AV jack points is high and requires more advanced DIY skills than most ordinary citizens will have.

It will be clearly understood that, if a prior art publication is referred to herein, this reference does not constitute an admission that the publication forms part of the common general knowledge in the art in Australia or in any other country.

SUMMARY OF INVENTION

The present invention is directed to a cable management system and components therefor, which may at least partially overcome at least one of the abovementioned disadvantages or provide the consumer with a useful or commercial choice.

With the foregoing in view, the present invention in one form, resides broadly in a cable management system including an elongate, flexible and length adjustable tubular conduit and a pair of mounting components to mount the elongate tubular conduit relative to a surface, one mounting component attaching a first end of the elongate conduit and a second mounting component attaching a second end of the elongate conduit, wherein together the tubular conduit and the mounting components define a body through which cables can extend and the tubular conduit is attachable and detachable as required from the mounting components used to mount the cable management system relative to the surface.

In an alternative form, the present invention resides in a cable management system including an elongate, flexible and length adjustable tubular conduit with a coupling provided at either end; and a pair of mounting components to mount the elongate tubular conduit relative to a surface, one mounting component attaching the coupling at a first end of the elongate conduit and a second mounting component attaching the coupling at a second end of the elongate conduit, wherein together the tubular conduit and the couplings define a body through which cables can extend and which is attachable and detachable as required from the mounting components used to mount the cable management system relative to the surface.

The present invention in another alternative form, resides broadly in a cable management system including an elongate, flexible and length adjustable tubular conduit, an attachment cuff provided at both ends of the elongate conduit, the attachment cuff having a tubular extension having a first portion of an attachment mechanism; and a pair of hollow elbow couplings each having a second portion of the attachment mechanism corresponding to the first portion on the attachment cuff and a mounting assembly to mount the elbow couplings relative to a surface, one elbow coupling attaching the attachment cuff at a first end of the elongate conduit and a second elbow coupling attaching the attachment cuff at a second end of the elongate conduit, wherein together the tubular conduit and the attachment cuffs define a body through which cables can extend and which is attachable and detachable as required from the elbow couplings used to mount the cable management system relative to the surface.

The cable management system of the present invention does not require that the operator use fish wires to route the cables through the wall and simply uses gravity to get the cables through.

The present invention in an alternative form, resides broadly in a cable management system including an elongate, flexible and length adjustable tubular conduit with an elbow coupling provided at either end, the elbow coupling having a tubular extension having a first portion of an attachment mechanism; and a pair of mounting components to mount the elbow couplings relative to a surface, each having a second portion of the attachment mechanism corresponding to the first portion on the elbow coupling, one mounting component attaching the elbow coupling at a first end of the elongate conduit and a second mounting component attaching the elbow coupling at a second end of the elongate conduit, wherein together the tubular conduit and the elbow couplings define a body through which cables can extend and which is attachable and detachable as required from the mounting components used to mount the cable management system relative to the surface.

The cable management system of the present invention is particularly well suited for collecting and protecting cables which a user may wish to run from one location to another or may wish to hide for aesthetic reasons. It is particularly useful for devices where cables can be hidden internally within a wall. Devices such as wall mounted TVs and their associated equipment such as receivers, DVD players gaming consoles and the like are particularly targeted with the present invention. The present invention can also be used in business environments.

The present invention allows the cables which connect devices to extend within a conduit which maintains the cables together, protects them and also provides a fixed location for the cables within the wall. This allows access to the cables for installation or replacement as well as providing certainty to the user as to the location of the cables and certainty to others in knowing the location of the cables, particularly if additional work is undertaken on the wall. The cables can be accessed by simply removing the devices to which the cables are connected which are typically located in front of the mounting components of the cable management system of the invention in order to obscure them from view, whereupon the cable management system and the cables inside can be easily accessed.

The system of the present invention can be installed during construction of the wall or can be retrofitted into an already finished wall. The system of the present invention has the advantage that the cables are provided in the wall cavity which provides the wall with a neat and tidy appearance and provides the cables with protection and ease of access when required.

In some embodiments, the cable management system of the present invention includes an elongate, tubular conduit with a coupling provided at either end. The elongate tubular conduit can be any length as required or desired. It is preferred however that the elongate tubular conduit be length extendable or stretchable. It is preferred that when extended or stretched, some deformation is created and it is preferred that the tubular conduit be resilient in order to shorten once the force creating the extension or stretch is removed.

The tubular conduit can be created from any suitable material or materials. A plastic material is particularly preferred. Where plastic is used, it is preferred that the plastic is robust enough to resist punctures or damage such as may be caused by the cable ends when passing through the elongate conduit.

According to a particularly preferred embodiment, the tubular conduit is formed using a resilient helical member supporting a plastic material in relation thereto. In another embodiment, a series of longitudinally spaced apart ring members may be used supporting a plastic material in relation thereto.

The tubular conduit can be rigid but preferably, will be flexible. The tubular conduit may have portions which are rigid and portions which are flexible. For example, according to the preferred embodiment, the conduit itself is flexible with rigid or partially rigid couplings provided at either end.

The tubular conduit will also preferably be length adjustable. The conduit is capable of being stretched and compressed longitudinally. Preferably the formation of the conduit will allow this and may do so in any one or a variety of forms including the helical and ring configurations as mentioned above or a concertina form.

The tubular conduit can have any cross-sectional shape and any cross-sectional dimension. According to the particularly preferred embodiment, the conduit will be substantially circular in cross-section. The conduit is preferably between approximately 30 mm and 90 mm in external cross-sectional dimension, mainly due to size restrictions within the wall cavity. For example, in Australia, the minimum cavity dimension in an internal wall is approximately 70 mm. Preferably, the conduit is approximately 50 mm in external cross-sectional dimension.

It is preferred that the inner surface of the tubular conduit be configured to ease passage of the cables therethrough. It is particularly preferred that the internal surface of the conduit be relatively smooth.

The preferred coupling provided at either end of the tubular conduit can be of any type. For example, the coupling can be an internally threaded screw cuff which engages with an externally threaded portion, or the conduit coupling may be as simple as a portion of the conduit which receives a tubular portion of the mounting component with a circumferential clamp located thereabouts. The coupling can be overmoulded onto the conduit (by hose manufacturer or other), screwed on, glued on.

The coupling may be male or female coupling portion. It is preferred that the coupling also be hollow in order to allow cables to extend through the coupling. The coupling may be attached to the conduit with any appropriate attachment mechanism and the coupling may be attachable and detachable to the tubular conduit.

The coupling may have any shape. For example, the coupling may have portions which are angled relative to one another such as an elbow, preferably of approximately 90° or the coupling may have a substantially in line configuration. Typically, the coupling is shaped appropriately and according to a particularly preferred embodiment, the coupling is typically circular in cross-section.

According to a particularly preferred configuration, a coupling within the system of the present invention will generally be provided in one of a number of preferred embodiments.

According to one preferred embodiment, the coupling is provided as a substantially tubular collar which is received at least partially within a corresponding coupling provided on the mounting component. In this configuration, the coupling of the tubular conduit will typically be male component which is received within a correspondingly shaped and sized female component provided on the mounting component of the system.

Preferably, an at least partially circumferentially extending stop or abutment shoulder is generally provided relative to the tubular collar in order to prevent the tubular collar being inserted too far within the coupling on the mounting component.

It is also preferred that a releasable latching assembly be provided in order to allow the coupling of the tubular conduit to be attached and detached to the coupling on the mounting component.

One or more guide components are preferably provided in order to align the coupling of the tubular component with the coupling provided on the mounting component and in order to allow a user to more easily align the components for attachment relative to one another. It is preferred that the guide component include a protrusion which is received in a correspondingly sized and shaped depression or scholar located on the mounting component. It is preferred that there is a single guide protrusion provided on each coupling at each end of the tubular conduit. It is preferred that the guide protrusion extends towards the free end of the collar, away from the stop or abutment shoulder. It is also preferred that the guide protrusions are substantially solid.

The preferred latching assembly of the first embodiment of the coupling of the present invention will typically include a pair of latches, located substantially on opposed sides of the tubular collar. Normally, the latches will be offset from the guide protrusions.

Normally, each latch will be provided as a resilient tab which is movable in order to move a latch tongue into, and particularly from engagement with a latch assembly. Preferably, the resilient tab will be provided as a substantially L-shaped arm. A first portion of the arm will typically extend laterally away from the collar of the coupling and a second portion of the arm will typically extend substantially parallel to the collar from the end of the first part but spaced from the collar in order to allow movement of the second part relative to the collar. Typically, the L-shaped arm will extend in the direction away from the free end of the coupling.

A latch tongue is preferably provided on an outer side of the L-shaped arm. The latch tongue will typically engage with a latch assembly in the form of a latch opening, provided in the mounting component. According to a particularly preferred embodiment, the latch tongue will typically be substantially rectangular. The latch tongue will typically be spaced from both ends of the second part of the L-shaped arm. The latch tongue will typically extend substantially perpendicularly across the longitudinal dimension of the second part of the L-shaped arm. As indicated above, the L-shaped arm, and particularly the second part of the L-shaped arm is depressible towards the centre of the coupling in order to clear the latch tongue from the latch opening during attachment of the coupling from the mounting component and the arm is resilient in order to hold the latch tongue in the latch opening until detachment is desired. Normally, the latch arm will be depressed manually by a user.

According to another preferred embodiment, the coupling has a configuration which is basically the reverse configuration to that of the first embodiment. In this particular embodiment, the coupling of the second embodiment corresponds to the coupling of the first embodiment such that the two couplings will engage one another to form a secure, but detachable coupling arrangement. Therefore, the coupling of the first preferred embodiment is typically used on either the tubular conduit or the mounting component with the coupling of the second preferred embodiment being provided on the other of the tubular conduit or mounting component.

According to the second preferred embodiment, the coupling will typically include a substantially tubular collar but the collar is typically female to receive the male tubular collar of the first preferred embodiment. The coupling of the second preferred embodiment also includes an abutment shoulder, and typically, this abutment shoulder is internal. One or more scalloped or depressions s typically provided to receive the guide protrusions explained above in reference to the first preferred embodiment. Typically, there may be more than one scalloped or depression provided and normally, these will be provided in substantially opposed positions on the coupling of the second preferred embodiment. According to the most preferred second embodiment, the scallop or depression will be provided in the free end edge of the tubular collar.

The coupling of the second preferred embodiment is also provided with a portion of a latching assembly. In particular, the latching assembly provided on the second preferred embodiment of the coupling will typically include an opening or cavity to match the shape and size of the L-shaped arm provided on the first preferred embodiment. Normally, this opening or cavity will be provided in the substantially tubular collar such that the L-shaped arm can be partially received within the tubular collar during attachment.

A latch opening will normally be provided in the sidewall of the cavity in order to receive and engage the latch tongue provided on the first preferred embodiment. Normally, a pair of latching assemblies is provided although this number may vary and it is preferred that two latching assemblies are provided substantially on opposed sides of the tubular collar and offset from the scallops or depressions.

Depending upon whether the coupling of the first preferred embodiment or second preferred embodiment is provided on the tubular conduit, the press tab of the latching assembly can be provided closer to or further away from the opening which is formed in the wall and relative to which the mounting component of the cable management system of the present invention is provided. Provision of the press tab extending toward the opening may allow a user easier access to the press tab when the mounting component is pulled from the wall surface for attachment and detachment of the coupling therefrom.

The cable management system of the present invention also includes at least one, and typically a pair of mounting components used to mount the tubular conduit relative to a wall surface. Each of the mounting component is typically includes a mounting portion in order to mount the mounting component relative to the surface and a coupling attachment portion to attach a coupling provided on the elongate conduit.

The mounting portion of each mounting component will preferably include a flange that extend radially in order to overlie a portion of the wall or other surface into or through which an opening has been formed for the cable management system. The flange is typically planar in order to sit relatively flush against the wall surface. The flange can have any shape but will generally be circular or annular surrounding a central opening through the mounting component which is generally hollow in order to allow cables to be inserted there through.

In use, a rear surface of the flange of the mounting portion will typically directly abut a wall surface in order to locate the mounting component.

The mounting portion also typically includes a rearwardly extending tubular portion. Preferably, the tubular portion will be substantially the same shape and dimension as the elongate tubular conduit which is attached to the mounting component. As mentioned above, there is preferably an opening through the flange and indeed, through the mounting portion and the mounting component in order to form a bore through which cables can be received.

The tubular portion of the mounting portion can have any shape. For example, the tubular portion can be an elbow where portions are at different angles to one another or an in-line tubular portion. The preferred tubular portion will typically have an opening at either end to allow cables to be fed through the tubular portion of the mounting component.

Typically, the coupling or attachment portion is provided on the rearwardly extending tubular portion. Preferably, the rearwardly extending tubular portion is smaller in diameter than the flange which preferably extends radially outwardly from the tubular portion.

According to a preferred embodiment, one or more securing devices or assemblies preferably provided on the mounting portion in order to secure the mounting component relative to a wall. In its simplest form, the mounting component can be secured to the wall using an adhesive or fasteners such as screws and the like, in order to attach the flange directly to the wall. However, in order to be easily removable, it is preferred that a securing device or assembly which allows for removal of the mounting component (and the conduit) be provided. It would also be an advantage if the securing device or assembly could allow for retrofit of the cable management system into an existing wall.

According to the most preferred embodiment, at least one, and preferably three spring clips are provided on a rear side of the flange to achieve this purpose. Three spring clips are preferred on each elbow to hold it securely in place due to eccentric tension caused by the connecting flexible hose.

Preferably, each spring clip is mounted on a mounting arm provided on the rear surface of the flange. Each mounting arm is typically planar. Each mounting arm will preferably extend substantially perpendicularly to the plane of the flange. Each mounting arm will preferably be braced to the tubular portion to provide strength to the mounting arm.

Each spring clip is preferably mounted on a mounting arm and preferably projects outwardly away from the tubular portion. The spring clips will preferably act to force or hold the flange against the wall. The spring clips are provided in this manner also have the advantage of being hidden attachment so as to make the external appearance of the mounting component aesthetically pleasing. The spring clips also allow removal of the mounting component from the wall by pulling the mounting component away from the wall, which in turn draws the mounting component out of the opening in the or, against the biasing spring clips. In order to insert the mounting component into the whole formed in the wall, the spring clips are temporarily deformed in order to fit into the opening and held their whilst forcing the mounting component into the opening.

The coupling or attachment portion which is provided on the mounting component will preferably correspond to the coupling provided on the tubular conduit. As mentioned above, there are a number of preferred types of coupling and the coupling of one preferred embodiment is typically provided as the coupling or attachment portion of the conduit and the corresponding coupling is typically provided on the mounting component. As to the particular embodiment of coupling provided on each, this is not set but typically, the coupling of the first preferred embodiment is provided on the tubular conduit and the coupling of the second preferred embodiment is provided on the tubular portion of the mounting component.

In an alternative embodiment, the conduit may be attached to the mounting component using a threaded bayonet coupling and a mounting component adapted for bayonet coupling. In this embodiment, the coupling will preferably be tubular. Typically, the coupling will have an engagement portion to engage with the elongate conduit provided at one end of the coupling, and a first portion of a bayonet coupling assembly provided at the opposite end of the coupling.

The engagement portion to engage with the elongate conduit will preferably be or include a threaded portion. This will allow engagement with the preferred conduit of the helical configuration and allow the elongate conduit to be threaded into engagement with the coupling. The threaded portion may be provided externally on the coupling but an internally threaded portion is preferred. This will normally have the effect that a portion of the conduit is received within the coupling. The threaded portion may be a left hand thread or a right hand thread.

The bayonet coupling assembly provided between the coupling on the end of the elongate conduit and the mounting component will typically include a male portion and a female portion. The coupling of this particular embodiment may be provided with either the male portion or the female portion, and the mounting component will then be provided with the corresponding portion. It is preferred that the male portion is provided on the coupling and the female portion is provided on the mounting component.

The first portion of the bayonet coupling assembly provided on the coupling will typically include at least a pair of protrusions extending from an outer surface of the preferred tubular coupling portion. Preferably, a pair of protrusions is provided and the protrusions are on opposed sides of the coupling portion. The protrusions will each preferably be substantially cylindrical.

The coupling will typically be received within a female collar provided on the mounting component. The collar is preferably shaped to match the coupling and will further be dimensioned in order to closely receive the coupling within the female collar. Normally, the collar will have a number of openings therein, corresponding in number and separation distance to the number of protrusions provided on the coupling and the separation distance between the protrusions on the coupling.

It is preferred that the openings provided in the collar will be substantially L-shaped. The openings may extend into the collar but will preferably extend through the collar provided on the mounting component. Normally, each opening will have two parts thereto with the parts being substantially perpendicularly to one another. This will preferably have the effect that two separate movements are required to engage the coupling with the mounting component including a movement where the components are pressed together longitudinally and then a second movement where the parts are rotated relative to one another.

One portion of each preferred L-shaped opening will typically extend circumferentially on the female collar and the preferred second portion is an entry portion which is substantially perpendicularly located in the female collar to the first portion.

An enlarged portion may be provided at the end of the circumferential portion of the L-shaped opening in order to seat a protrusion in this portion securely and minimise the chance of accidental dislodgement of the protrusion from the enlarged portion. Typically, the enlarged portion will be provided with an abutment shoulder against which the protrusion provided on the coupling will abut, once properly attached.

According to an alternative embodiment, the elongate conduit may be directly attached to the mounting component. Again, this alternative embodiment is particularly preferred when the elongate conduit is provided in the helical configuration.

According to this embodiment, the mounting component is preferably provided with a collar and the collar is adapted to directly engage the end of the conduit. A particularly preferred manner in which this may be achieved is to provide a threaded portion on the collar. Again, the threaded portion can be provided externally, but will preferably be provided internally in order to attach the preferred helical conduit by receiving an end portion of the helical conduit in a preferably female collar provided with an internally threaded portion.

According to this embodiment, the mounting component may be provided in an elbow configuration or as a straight-in type in which the conduit is bent or deformed prior to insertion into the mounting component and thereby forming an elbow as required.

An additional mounting assembly may be included on the rear of the mounting flange, particularly in any straight-in embodiment in order to minimise the chance that the preferred spring clips can pull the flange into misalignment. In particular, a mounting assembly may be provided with a flange that is substantially parallel to but spaced from the rear of the mounting flange to balance any force applied by the spring clips and to maintain the mounting flange flush on the wall.

According to yet a further alternative embodiment, a coupling may be provided that is engaged permanently with the conduit and the coupling is engageable with the mounting component. Preferably, the coupling will be overmoulded onto the conduit and clipped to the mounting component.

According to this embodiment, the coupling may be provided in an elbow configuration or as a straight in type in which the conduit is bent or deformed prior to insertion into the mounting component and thereby forming an elbow as required.

Normally, the coupling will be provided with a radially extending flange or flange portions at or adjacent the end of the coupling opposite the conduit. According to a preferred embodiment, a number of flange portions are provided. According to a particularly preferred embodiment, three flange portions are provided, one which is approximately 180° about a portion of the coupling, and two other portions which are spaced from the first portion and from each other and extends approximately 90° about a portion of the coupling.

The mounting component of this particular embodiment will preferably include a mounting flange to abut a wall surface and the spring clip assemblies as discussed above spaced around a central opening. Preferably, a number of guide posts are provided, normally one adjacent each spring clip assembly in order to be received between the preferred spaced apart flange portions provided on the coupling for alignment of the coupling with the mounting component.

One or more, and preferably a number of arms with abutment shoulders are provided on the mounting component in order to engage with the flange portions. Preferably, the arms are slightly resilient to allow temporary deformation of the arms during attachment and detachment of the coupling. Each arm will preferably have an angled portion provided in order to force deformation of the arms as the flange portion passes. Thereafter, the abutment shoulders will typically abut a surface of the flange portions in order to hold the coupling to the mounting component.

The system of the present invention may further include a tapered leader for removable attachment to or relative to the tubular conduit during insertion into or through the wall cavity. This is particularly case in situations where the wall cavity is provided with internal installation or other material or members between the wall facing panels which may cause issues with trying to feed the tubular conduit into or through the wall.

In another embodiment, the present invention resides in a tapered leader for removable attachment to or relative to a tubular conduit during insertion into or through a wall cavity.

In another embodiment, the present invention resides in a cable management system including an elongate, flexible and length adjustable tubular conduit and a pair of mounting components to mount the elongate tubular conduit relative to a surface, one mounting component attaching a first end of the elongate conduit and a second mounting component attaching a second end of the elongate conduit, and a tapered leader for removable attachment to or relative to a tubular conduit during insertion into or through a wall cavity wherein together the tubular conduit and the mounting components define a body through which cables can extend and the tubular conduit is attachable and detachable as required from the mounting components used to mount the cable management system relative to the surface.

In another embodiment, the present invention resides in a method for installing an elongate, flexible and length adjustable tubular conduit into or through a wall cavity, the method including the steps of providing an elongate, flexible and length adjustable tubular conduit for installation into or through a wall, attaching a tapered leader for to or relative to a leading end of the tubular conduit during insertion into or through a wall cavity and attaching an elongate member to the tapered leader in order to draw the tubular conduit into or through the wall.

The tapered leader will typically be attached to the tubular conduit during insertion into or through the wall and then be removed from the tubular conduit in order to allow coupling of the tubular conduit to a mounting component.

According to a first preferred embodiment, the tapered leader may include an at least partially conical forward portion. The tapered leader may include a collar to allow removable attachment to the tubular conduit and preferably, the collar will be substantially cylindrical. It is preferred that the collar be internally threaded or have an engagement assembly to allow releasable engagement with the tubular conduit. An opening is preferably associated with a forward end or portion of the tapered leader. The opening may be provided in a forwardly extending tab portion or alternatively, simply through a forward portion of the tapered leader.

In an alternative configuration, the tapered leader may have an at least partially wedge shaped forward portion. The tapered leader may include a collar to allow removable attachment to the tubular conduit and preferably, the collar will be substantially cylindrical. It is preferred that the collar be internally threaded or have an engagement assembly to allow releasable engagement with the tubular conduit. An opening is preferably associated with a forward end or portion of the tapered leader. The opening may be provided in a forwardly extending tab portion or alternatively, simply through a forward portion of the wedge shaped portion.

The present invention may additionally include cover plate or faceplate in order to at least partially close the opening in the mounting component to provide an aesthetically pleasing view to a user. Preferably, the cover plate or faceplate will simply attached to or relative to the mounting component, preferably at least partially within the opening in the mounting component to partially close the opening in the mounting component. It is particularly preferred that the cover plate or faceplate be at least partially crescent shaped as this will provide a covering for the majority of the opening but leave a small portion of the opening uncovered to allow cables to extend therefrom.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 2a is an exploded close-up illustration of the cable management system of a preferred embodiment of the present invention.

FIG. 2b is an illustration of the cable management system shown in FIG. 2a but assembled.

DESCRIPTION OF EMBODIMENTS

Figure 1:
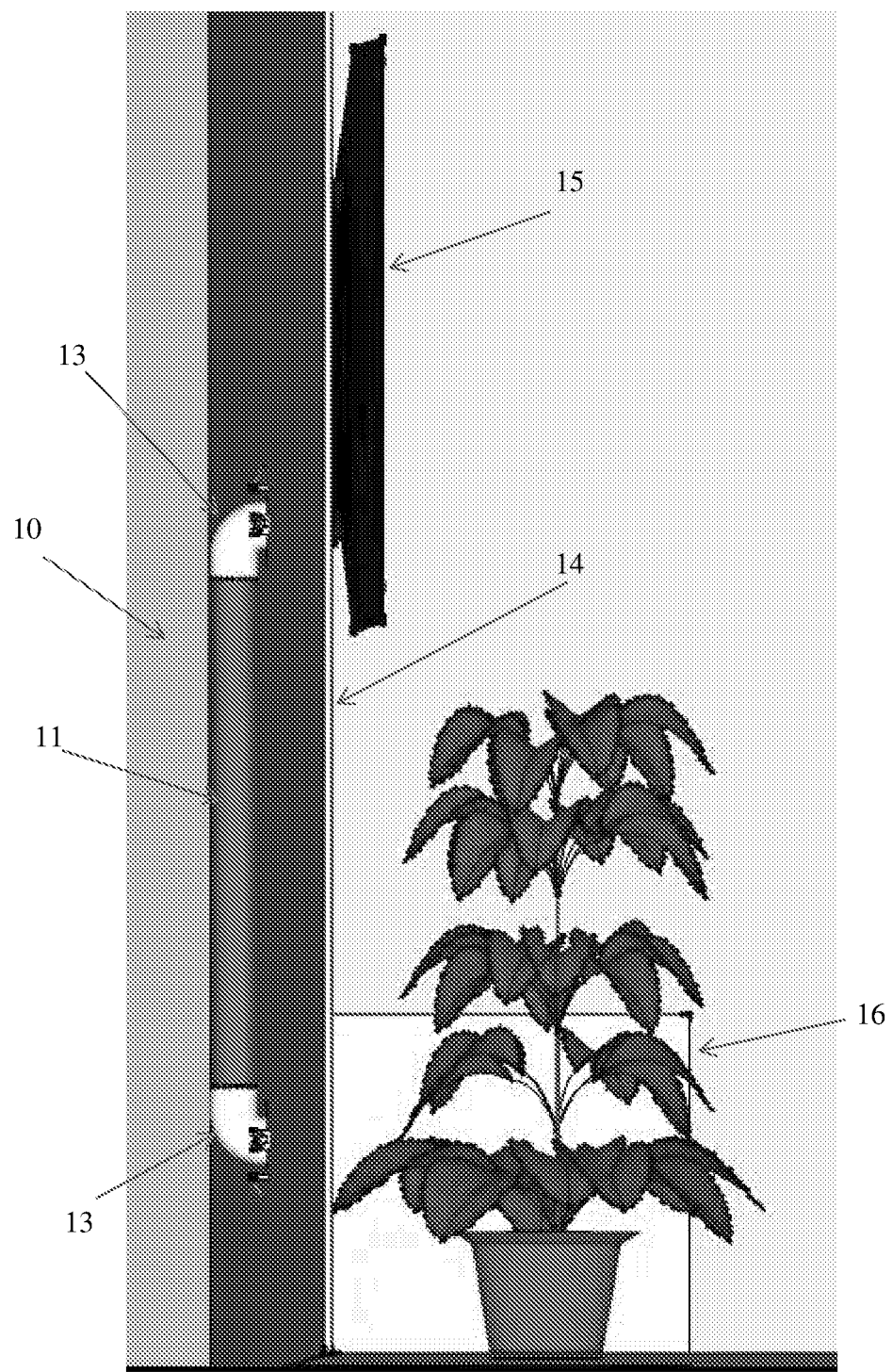
FIG. 1 is a schematic cross sectional illustration of a preferred location for a cable management system according to an aspect of the present invention.
Figure 3:
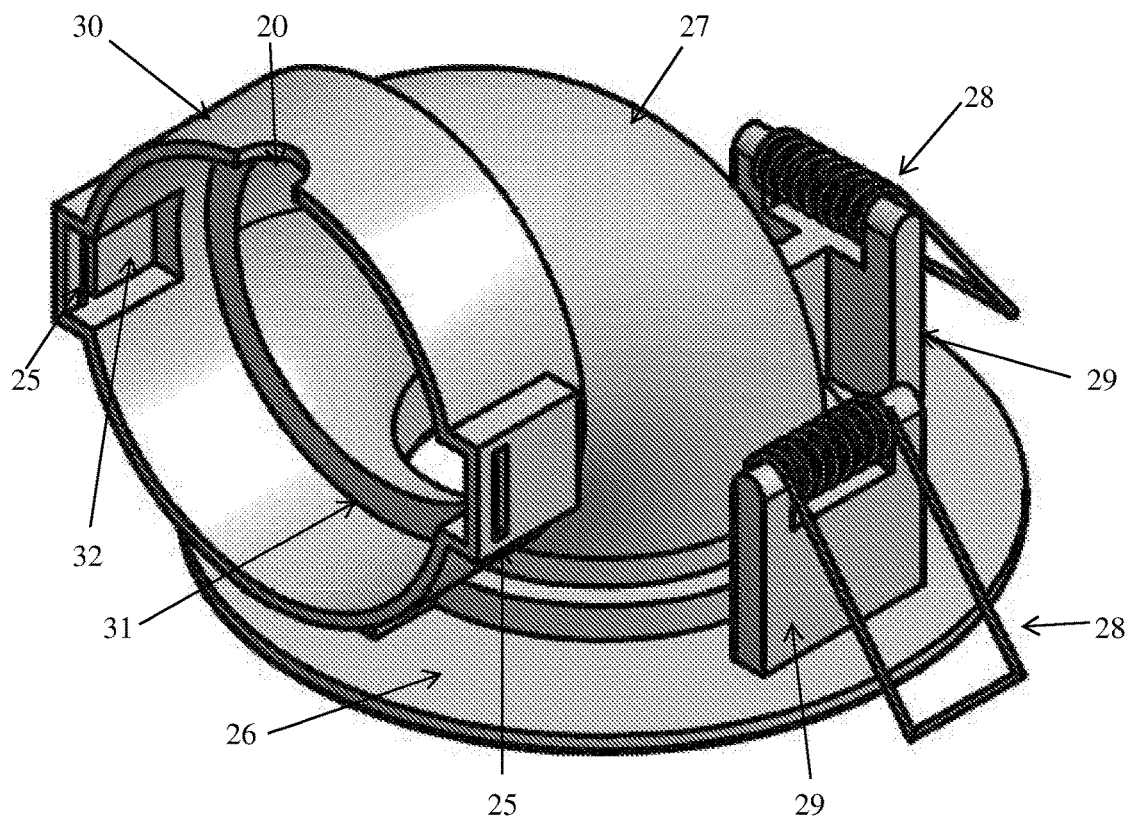
FIG. 3 is an isometric view of an elbow mounting component as illustrated in FIG. 2.

According to a particularly preferred embodiment of the present invention, a cable management system and components therefore are provided.

The cable management system 10 of the illustrated preferred embodiment includes an elongate tubular conduit 11 with a coupling 12 provided at either end; and a pair of mounting components 13 to mount the elongate tubular conduit 11 relative to a wall 14. As illustrated in FIG. 2 in particular, one mounting component 13 attaches the coupling 12 at a first end of the elongate conduit 11 and a second mounting component 13 attaches the coupling 12 at a second end of the elongate conduit 11. Together the tubular conduit 11 and the couplings 12 define a body through which cables (not shown) can extend and which is attachable and detachable as required from the mounting components 13 used to mount the cable management system relative to the wall 14.

The cable management system of the present invention is particularly well suited for collecting and protecting cables which a user may wish to run from one location to another. It is particularly useful for devices where cables can be hidden internally of the wall. Devices such as wall mounted TVs 15 and their associated equipment such as receivers, DVD players gaming consoles and the like which are located in a cabinet 16 separated from the TV 15.

A general Figure showing the location and use of the present invention is illustrated in FIGS. 1 and 2.

Figure 7:
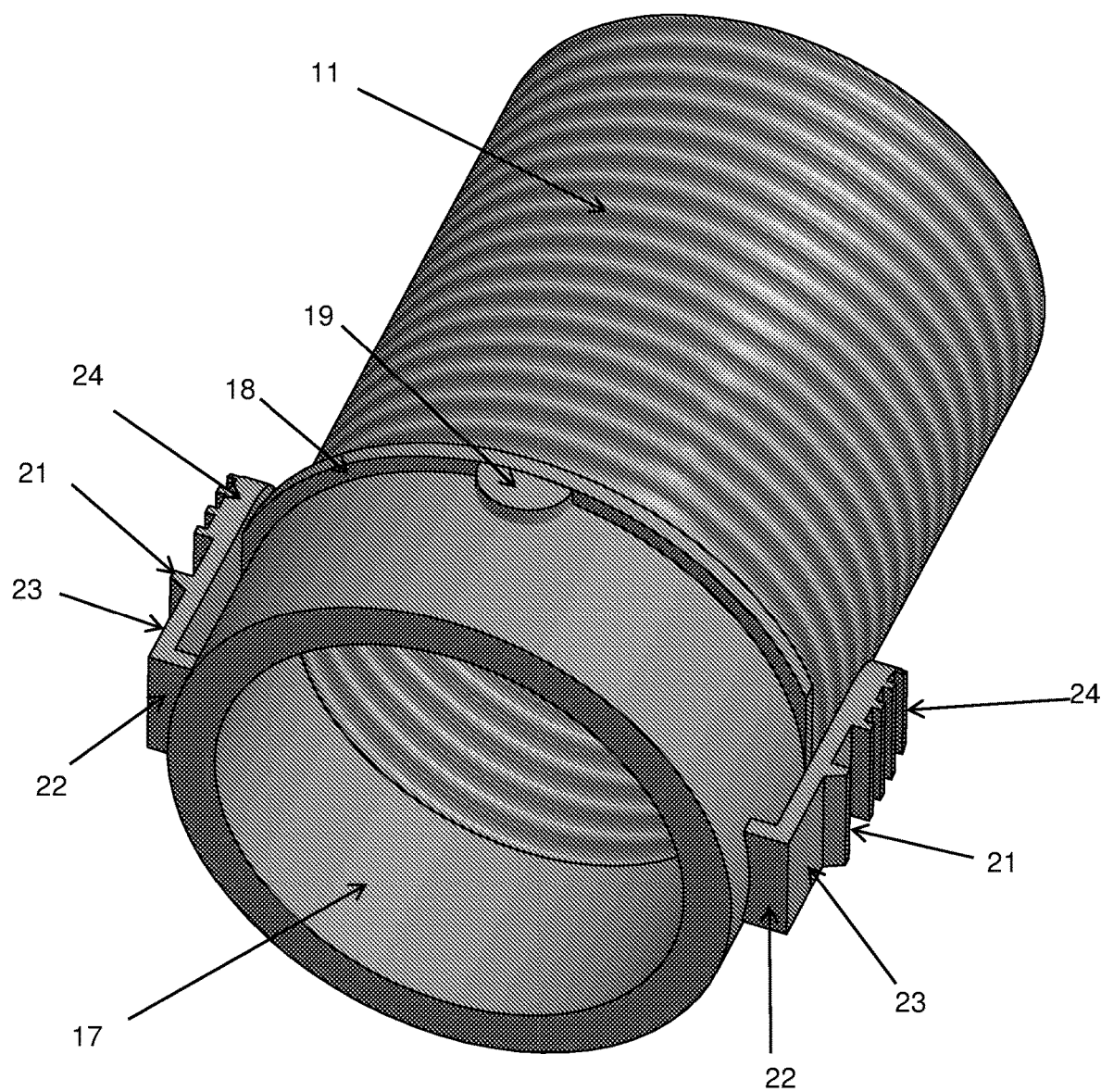
FIG. 7 is an isometric view of a cable management conduit with attachment cuff according to a particularly preferred embodiment of the present invention.
Figure 8:
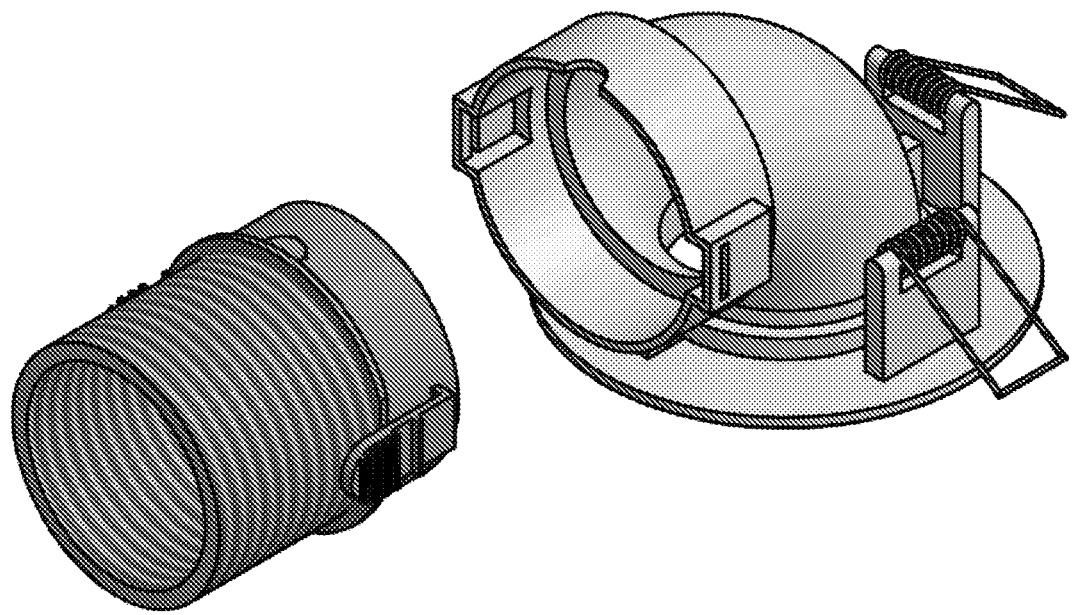
FIG. 8 is an exploded isometric view the conduit from FIG. 7 attaching to the mounting component illustrated in FIG. 3.
Figure 9:
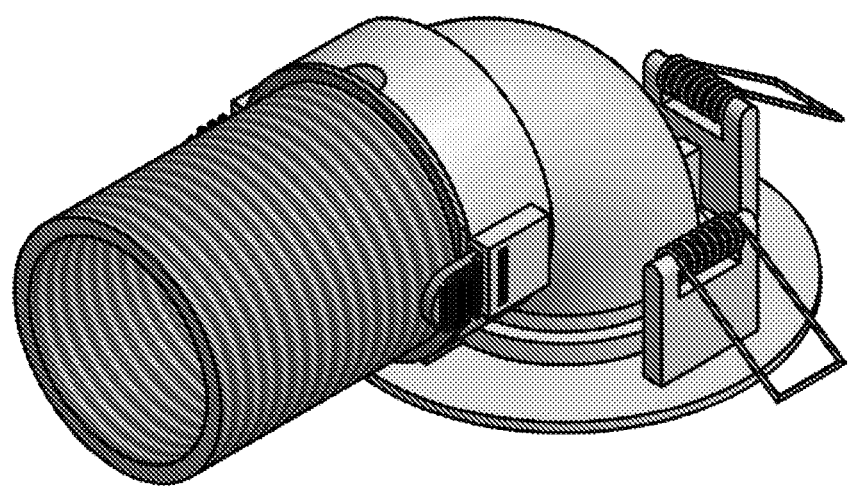
FIG. 9 is an isometric view of the configuration in FIG. 8 but attached.

The cable management system 10 includes an elongate, tubular conduit 11 with a coupling 12 provided at either end, a preferred embodiment of which is illustrated in FIG. 7. The preferred elongate tubular conduit 11 is length extendable or stretchable. When extended or stretched, some deformation is created and the preferred tubular conduit, also being resilient, retracts once the force creating the extension is removed. The resilient nature of the preferred conduit means that an amount of tension is maintained in the conduit making the threading of cables easier.

According to the preferred embodiment, the conduit 11 is resilient and flexible with rigid or partially rigid couplings 12 provided at either end.

In Australia, the minimum cavity dimension in an internal wall is approximately 70 mm. The conduit illustrated in FIG. 7 has representative dimensions and is approximately 50 mm in external cross-sectional dimension.

The coupling 12 provided at either end of the tubular conduit 11 can be of any type. The coupling 12 illustrated is hollow in order to allow cables to extend through the coupling 12.

The coupling is a substantially in line configuration. According to the first preferred embodiment illustrated in FIG. 7, the coupling 12 is provided as a substantially tubular collar 17 which is received at least partially within a corresponding coupling provided on the mounting component 13, discussed in more detail below. In this configuration, the coupling 12 of the tubular conduit 11 is a male component which is received within a correspondingly shaped and sized female component provided on the mounting component 13.

An at least partially circumferentially extending stop or abutment shoulder 18 is generally provided relative to the tubular collar 17 in order to prevent the tubular collar 17 being inserted too far within the coupling on the mounting component 13.

A guide protrusion 19 is provided in order to align the tubular conduit 11 with the coupling provided on the mounting component 13 and in order to allow a user to more easily align the components for attachment relative to one another. As illustrated, the guide protrusion 19 which is received in a correspondingly sized and shaped depression or scallop 20 located on the mounting component 13. The guide protrusion 19 extends towards the free end of the collar 17, away from the stop or abutment shoulder 18.

The preferred latching assembly of the coupling 12 include a pair of latches, located substantially on opposed sides of the tubular collar. Normally, the latches will be offset from the guide protrusion.

Normally, each latch will be provided as a resilient tab which is movable in order to move a latch tongue 21 into, and particularly from engagement with a latch assembly. Preferably, the resilient tab will be provided as a substantially L-shaped arm. A first portion 22 of the arm extends laterally away from the collar 17 of the coupling and a second portion 23 of the arm extends substantially parallel to the collar 17 from the end of the first part 22 but spaced from the collar 17 in order to allow movement of the second part 23 relative to the collar 17. Typically, the L-shaped arm extends in the direction away from the free end of the coupling 12.

The latch tongue 21 is preferably provided on an outer side of the L-shaped arm. The latch tongue 21 engages with a latch opening 25, provided in the mounting component 13. According to a particularly preferred embodiment, the latch tongue 21 is substantially rectangular and spaced from both ends of the second portion 23 of the L-shaped arm. The latch tongue 21 extends substantially perpendicularly across the longitudinal dimension of the second portion 23 of the L-shaped arm. As indicated above, the L-shaped arm, and particularly the second part 23 of the L-shaped arm is depressible towards the centre of the coupling 12 in order to clear the latch tongue 21 from the latch opening 25 during attachment of the coupling 12 from the mounting component 13 and the arm is resilient in order to hold the latch tongue 21 in the latch opening 25 until detachment is desired. Normally, the latch arm will be depressed manually by a user using the end of the second portion 23 as a press tab 24.

A preferred mounting component 13 is illustrated in FIGS. 3 to 6. Each of the mounting components 13 includes a mounting portion in order to mount the mounting component relative to the surface and a coupling attachment portion to attach a coupling provided on the elongate conduit 11.

The mounting portion of each mounting component 13 includes a flange 26 that extends radially in order to overlie a portion of the wall or other surface into or through which an opening has been formed for the cable management system 10. The flange 26 is planar in order to sit relatively flush against the wall surface and can have any shape but will generally be circular or annular surrounding a central opening through the mounting component 13 which is generally hollow in order to allow cables to be inserted therethrough.

In use, a rear surface of the flange 26 of the mounting portion 13 abuts a wall surface in order to locate the mounting component.

The mounting portion also includes a rearwardly extending tubular portion 27. The tubular portion will preferably be substantially the same cross-sectional shape and dimension as the elongate tubular conduit 11 which is attached to the mounting component 13. As mentioned above, there is preferably a bore through the flange 26 and indeed, through the mounting portion and the mounting component 13 in order to form a bore through which cables can be received.

Figure 4:
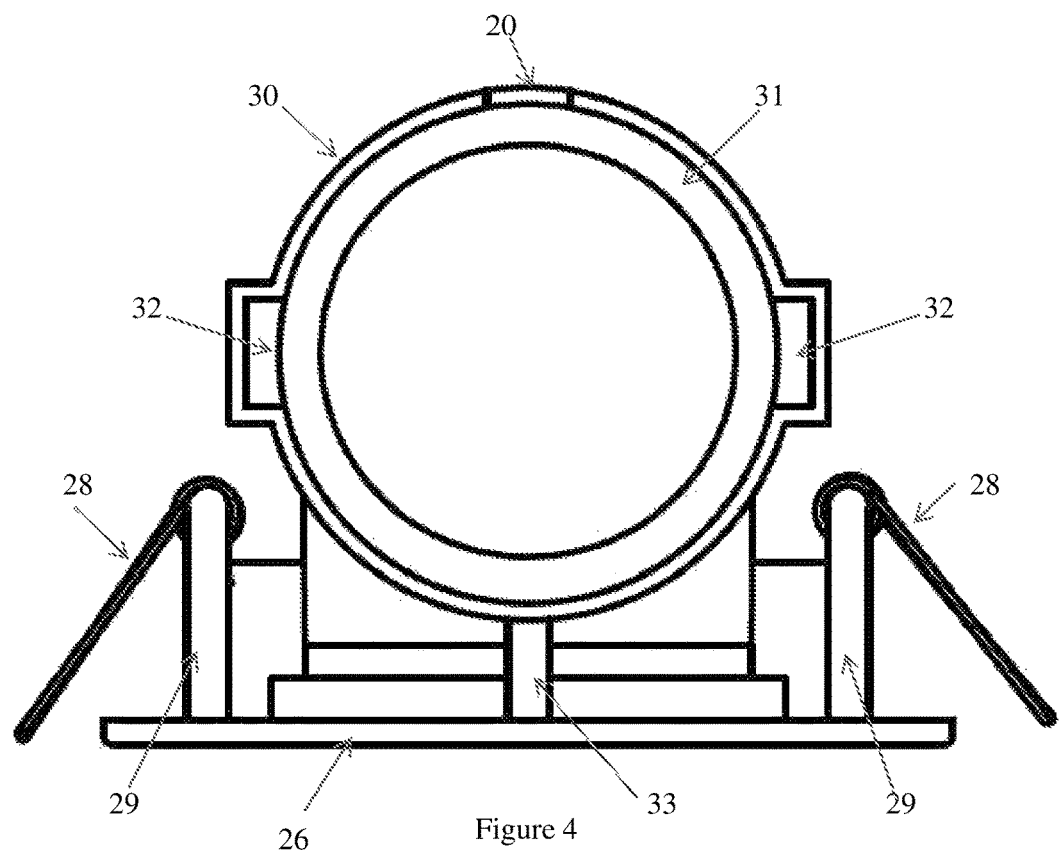
FIG. 4 is a view from beneath the elbow mounting component as illustrated in FIG. 3.
Figure 5:
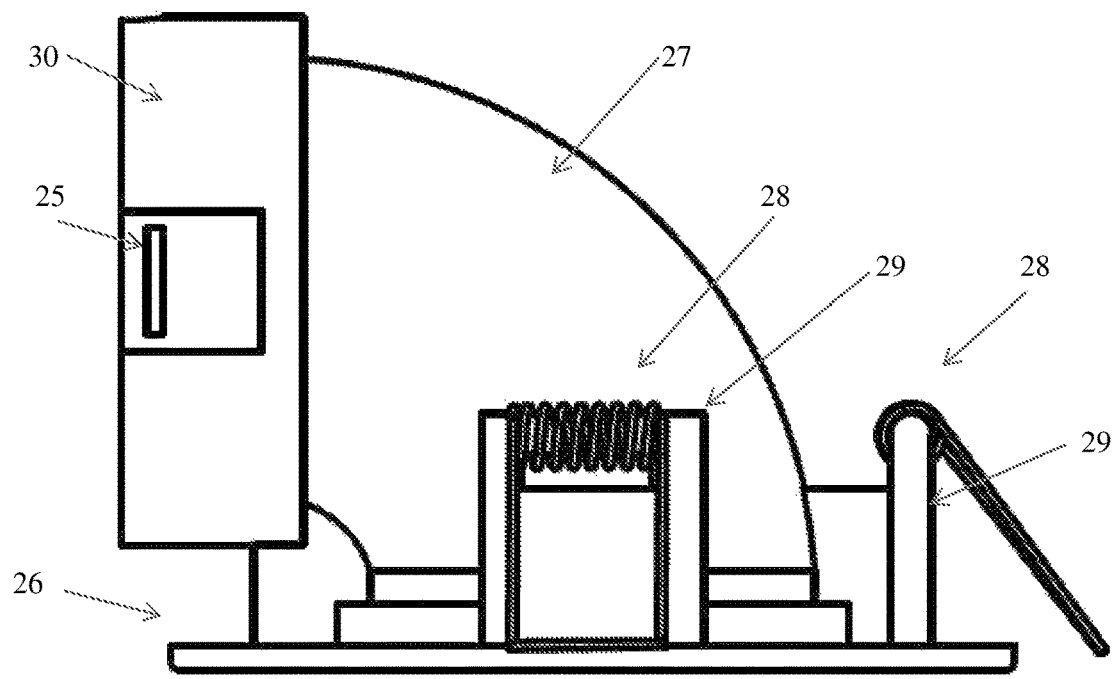
FIG. 5 is a right side view of the elbow mounting component as illustrated in FIG. 3.
Figure 6:
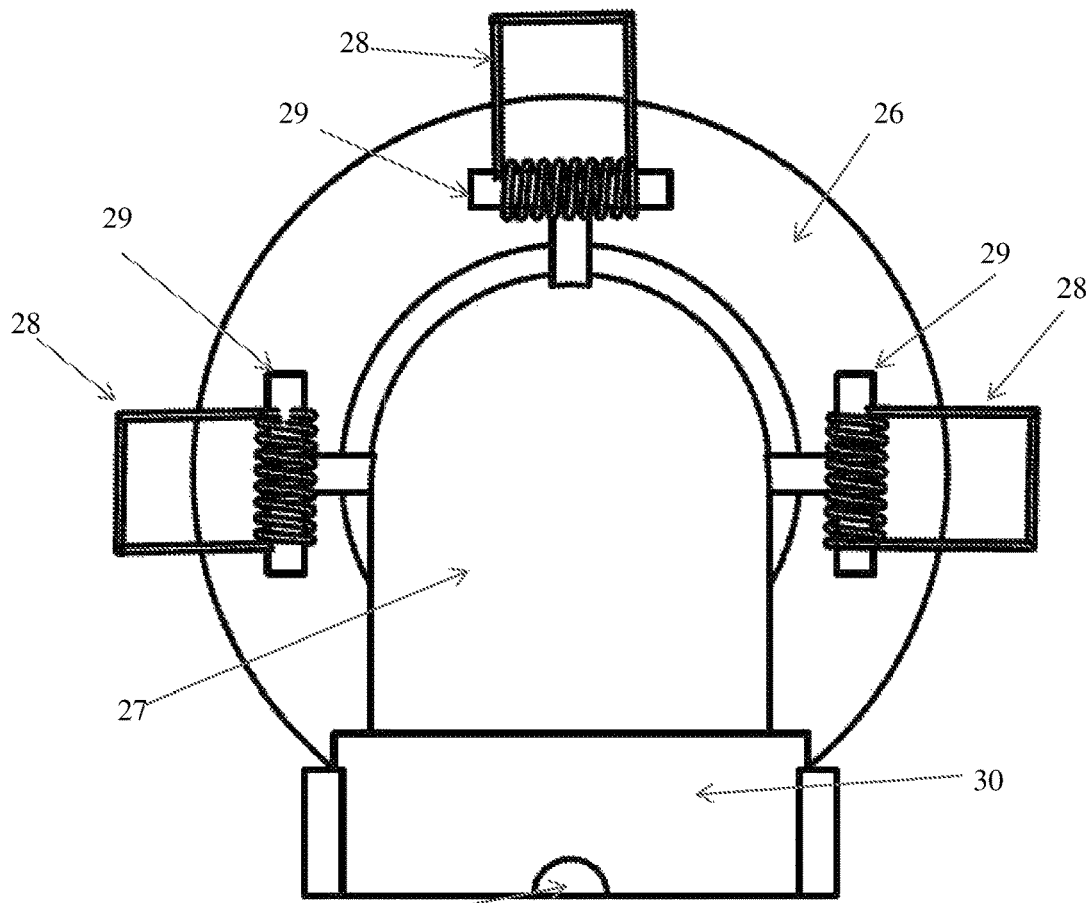
FIG. 6 is a rear view of the elbow mounting component as illustrated in FIG. 3.

The tubular portion of the illustrated embodiment is a 90 degree elbow where portions are at different angles to one another. A support member 33 is preferably provided between the rear of the flange 26 and the angled portion of the elbow as best illustrated in FIG. 4.

The coupling attachment portion is provided on the rearwardly extending tubular portion 27. Preferably, the rearwardly extending tubular portion 27 is smaller in diameter than the flange 26 which preferably extends radially outwardly from the tubular portion 27.

According to the most preferred embodiment, three spring clips 28 are provided on a rear side of the flange 26 to achieve this purpose. Three spring clips 28 are preferred on each mounting component 13 to hold it securely in place due to eccentric tension caused by the conduit 11.

Each spring clip 28 is mounted on a mounting arm 29 provided on the rear surface of the flange 26. Each mounting arm is typically planar extending substantially perpendicularly to the plane of the flange 26. Each mounting arm 29 is braced to the tubular portion 29 to provide strength to the mounting arm.

Each spring clip 28 is mounted on a mounting arm 29 and projects outwardly away from the tubular portion 27. The spring clips 28 act to force or hold the flange 26 against the wall 14. The spring clips 28 are provided in this manner also have the advantage of being hidden so as to make the external appearance of the mounting component 13 aesthetically pleasing. The spring clips 28 also allow removal of the mounting component 13 from the wall 14 by pulling the mounting component 13 away from the wall 14, which in turn draws the mounting component 13 out of the opening in the or, against the bias of the spring clips 28. In order to insert the mounting component 13 into the hole formed in the wall 14, the spring clips 28 are temporarily deformed in order to fit into the opening and held their whilst forcing the mounting component 13 into the opening.

The mounting component also includes a coupling having a configuration which is basically the reverse configuration to the coupling of the tubular conduit 11 to form a secure, but detachable coupling arrangement.

The coupling as illustrated in FIGS. 3 to 6 includes a substantially tubular collar 30 but the collar is typically female to receive the male tubular collar 17 of the coupling of the tubular conduit 11. The coupling of mounting component 13 also includes an abutment shoulder 31, but this abutment shoulder 31 is internal. A scallop 20 is provided to receive the guide protrusion 19 explained above in reference to the coupling of the tubular conduit 11.

The coupling of the mounting component 13 is also provided a cavity 32 to match the shape and size of the L-shaped arm provided on the coupling of the tubular conduit 11. Normally, this cavity 32 is provided in the substantially tubular collar 30 such that the L-shaped arm can be partially received within the tubular collar during attachment.

The latch opening 25 provided in the sidewall of the cavity 32 in order to receive and engage the latch tongue 21 provided on the coupling of the tubular conduit 11. Normally, a pair of latching assemblies is provided, although this number may vary and it is preferred that two latching assemblies are provided substantially on opposed sides of the tubular collar 30 and offset from the scallop 20.

In installing the system of the preferred embodiment, two holes of approximately 88 mm diameter are drilled into the plasterboard wall 14 (or similar type wall) at the requisite positions, approximately in a vertical orientation to each other, and of minimum diameter to insert and accommodate the mounting components 13. One hole is higher than the other on the wall 14 as illustrated in FIGS. 1 and 2.

One end of the flexible, stretchable conduit 11 is attached to one mounting component 13 and then the other, unattached end of the conduit 11 is fed into the top hole drilled in the wall 14. The conduit 11 is fed in allowing it to drop down vertically in the wall cavity.

To insert the mounting component 13 into the wall 14, the springs clips 28 on the mounting component 13 are depressed backwards to enable the spring clip 28 to fit inside the top portal hole as well. Mounting component 13 is pushed in, until the spring clips 28 on the mounting component 13 rebound against the back of the wall 14 to hold the mounting component 13 in place.

An operator will then preferably measure and cut flexible conduit to approximate the required length. A hand is inserted in the second and lower portal hole to pull through the flexible and stretchable conduit 11.

The other mounting component 13 is attached to the free end of the conduit 11 that has been pulled through. The conduit 11 is then released and the mounting component 13 inserted with the elbow leg attached to the flexible conduit 11 facing vertically upwards.

To insert the other mounting component 13 into the wall 14, the spring clips 28 on the mounting component 13 are depressed backwards to enable the spring clip 28 to fit inside the top portal hole as well. The mounting component 13 is pushed in, until the spring clips 28 on the mounting component 13 rebound against the back of the wall 14 to hold the mounting component 13 in place.

Cords & cables can now be fed through the continuous conduit 11. It is recommended these be fed from the top down.

Figure 10:
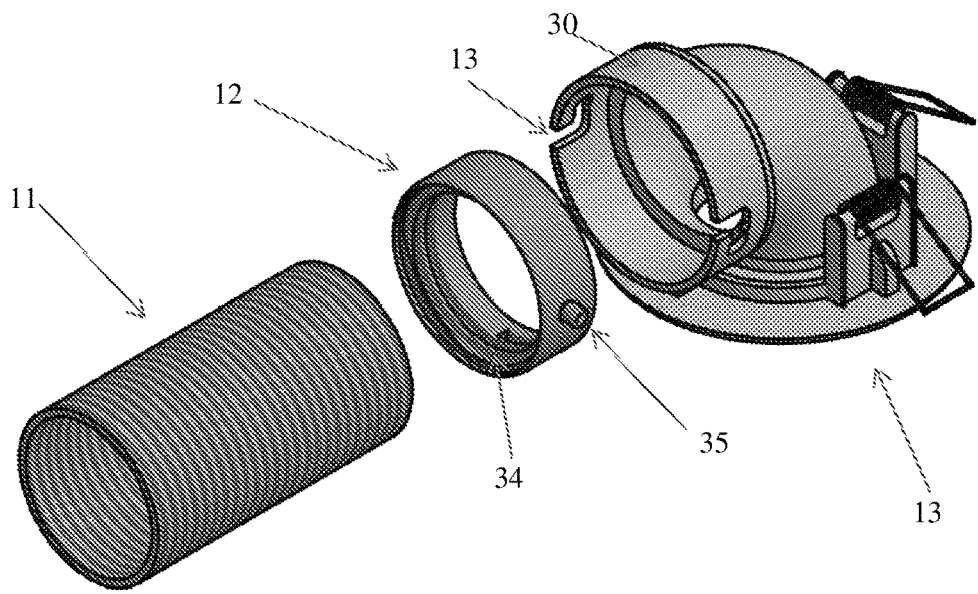
FIG. 10 is an exploded isometric view of an alternative threaded bayonet configuration of the present invention.
Figure 11:
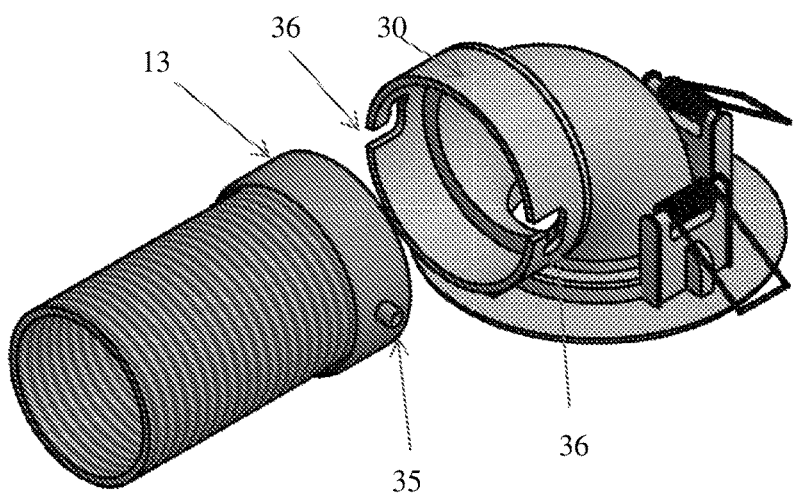
FIG. 11 is a partially exploded view of the configuration illustrated in FIG. 10.
Figure 12:
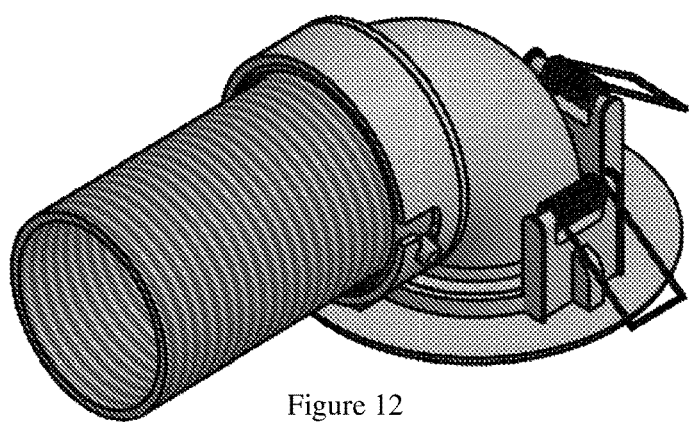
FIG. 12 is an isometric view of the configuration in FIG. 11 but attached.

In an alternative embodiment illustrated in FIGS. 10 to 12, the conduit 11 is attached to the mounting component 13 using a threaded bayonet coupling 12 and a mounting component 13 adapted for bayonet coupling. In the embodiment illustrated in FIGS. 10 to 12, the coupling 12 is tubular. The coupling 12 has an engagement portion to engage with the elongate conduit 11 provided at one end of the coupling 12 and a first portion of a bayonet coupling assembly provided at the opposite end of the coupling 12.

The engagement portion to engage with the elongate conduit 11 is an internally threaded portion 34, best illustrated in FIG. 10. This allows engagement with the conduit 11 with a helical configuration and allows the elongate conduit 11 to be threaded into engagement with the coupling 12.

The coupling 12 of the particular embodiment illustrated in FIGS. 10 to 12 is a male portion and the female portion is provided on the mounting component The first portion of the bayonet coupling assembly provided on the coupling 12 includes a pair of protrusions 35 extending from an outer surface of the tubular coupling 12. The protrusions 35 are provided on opposed sides of the coupling 12, each being substantially cylindrical in shape.

The coupling 12 is received within a female collar 30 provided on the mounting component 13. The collar 30 is shaped to match the coupling 12 and dimensioned in order to be closely received within the collar 30. As illustrated in FIGS. 10 to 12, the collar 30 has a number of substantially L-shaped openings 36 therein, corresponding in number and separation distance to the number of protrusions 35 provided on the coupling 12 and the separation distance between the protrusions 35 on the coupling 12.

The openings 36 extend through the collar 30 provided on the mounting component 13. As illustrated in FIGS. 10 to 12, each opening 36 has two parts thereto with the parts being substantially perpendicular to one another. Two separate movements are thus required to engage the coupling 12 with the mounting component 13 including a movement where the components are pressed together longitudinally and then a second movement where the parts are rotated relative to one another.

One portion of each L-shaped opening 36 extends circumferentially on the collar 30 and the second portion is an entry portion which is substantially perpendicularly located in the collar 30 to the first portion.

An enlarged portion is provided at the end of the circumferential portion of the L-shaped opening 36 in order to seat a protrusion 35 in this portion securely and minimise the chance of accidental dislodgement of the protrusion 35 from the enlarged portion. Typically the enlarged portion will be provided with an abutment shoulder against which the protrusion 35 provided on the coupling 12 will abut once properly attached.

Figure 13:
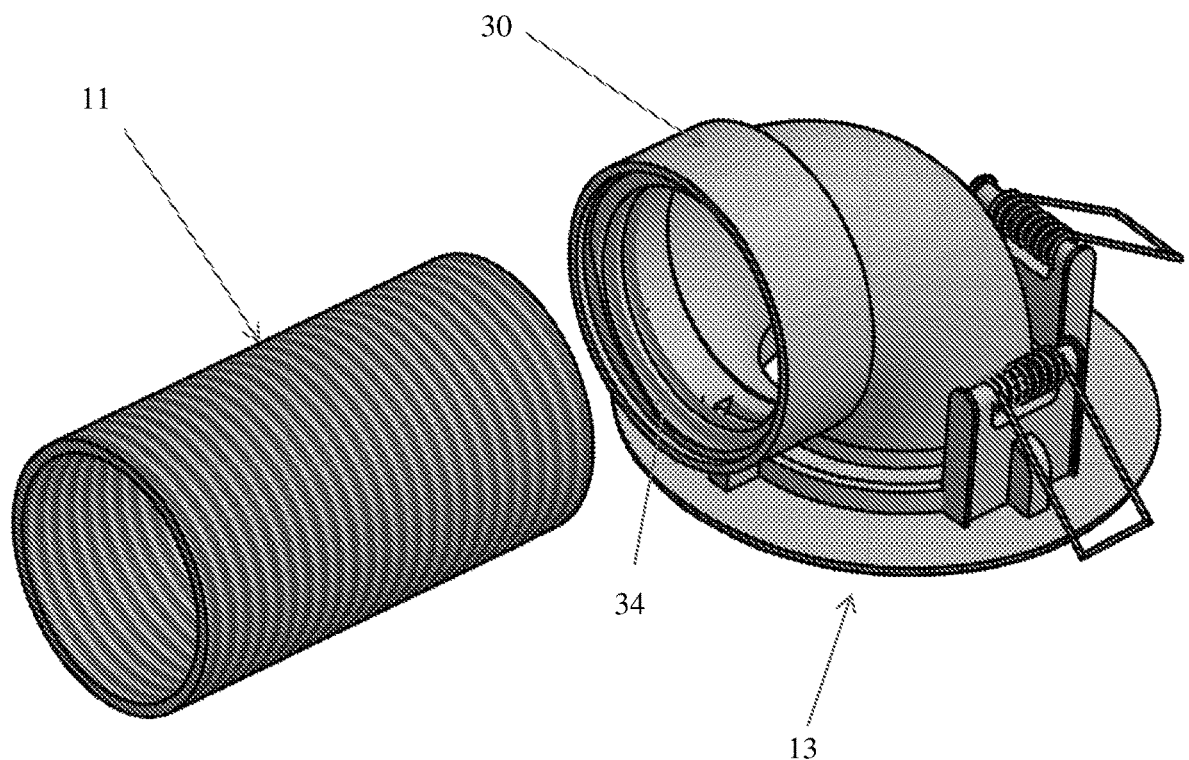
FIG. 13 is an exploded isometric view of an alternative configuration of the present invention in which the conduit is directly threaded to an elbow mounting component.
Figure 14:
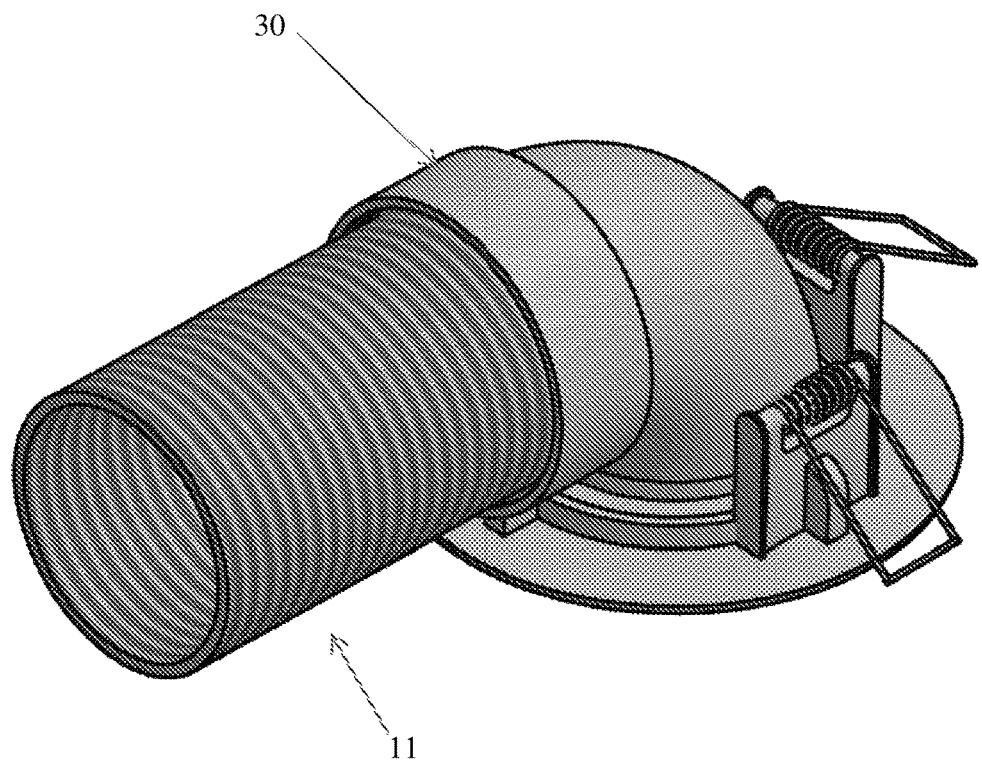
FIG. 14 is an isometric view of the configuration in FIG. 13 but attached.

According to an alternative embodiment illustrated in FIGS. 13 and 14, the elongate conduit 12 may be directly attached to the mounting component 13 without an intervening coupling. Again, this alternative embodiment is particularly preferred when the elongate conduit 12 is provided in the helical configuration.

According to this embodiment, the mounting component 13 is provided with a collar 30 and the collar 30 is adapted to directly engage the end of the conduit 11. A particularly preferred manner in which this may be achieved is to provide an internally threaded portion 34 on the collar 30.

Figure 15:
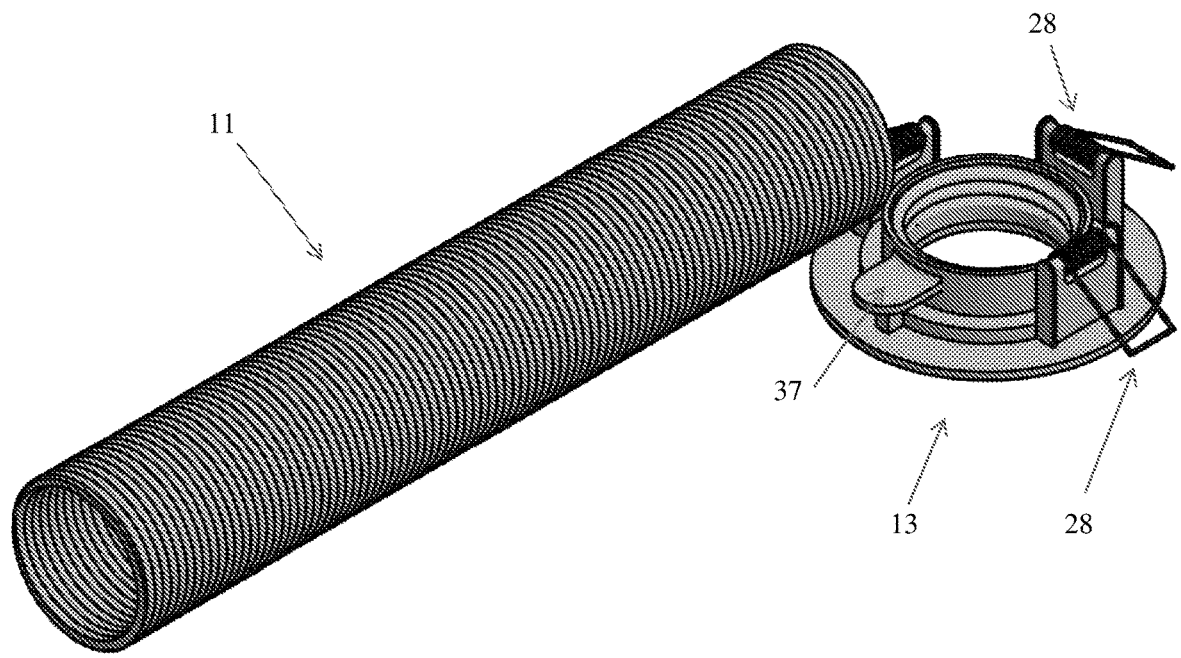
FIG. 15 is an exploded isometric view of an alternative configuration of the present invention in which the conduit is directly threaded to a mounting component to form an elbow.
Figure 16:
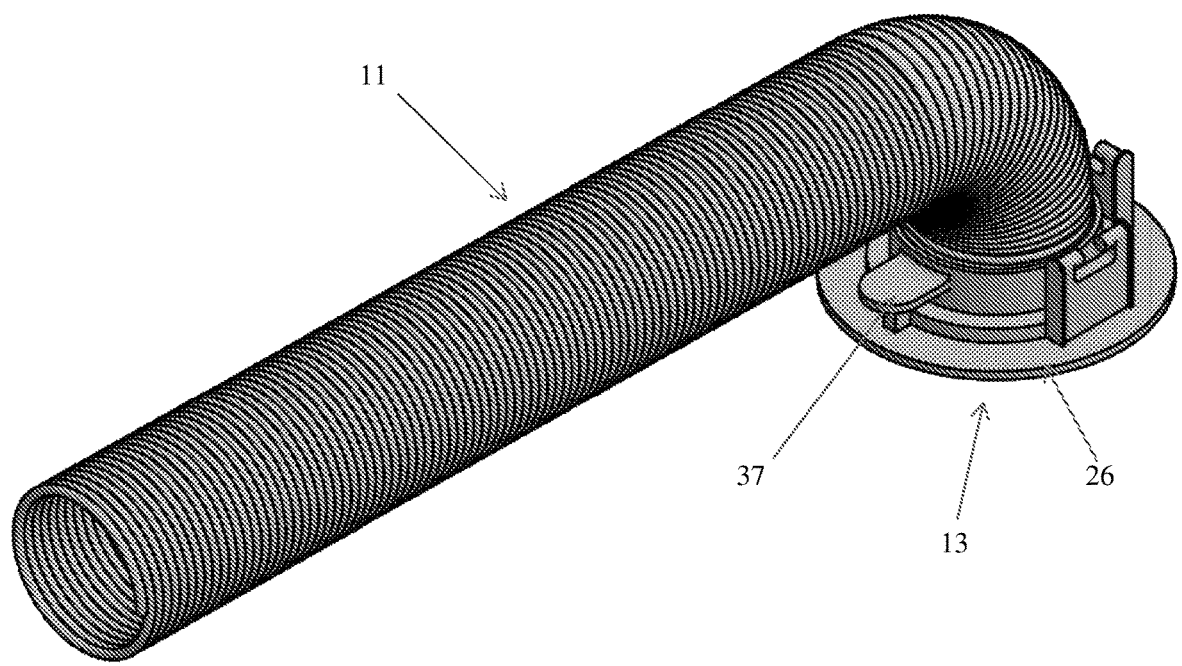
FIG. 16 is an isometric view of the configuration in FIG. 15 but attached.

According to this embodiment, the mounting component 13 may be provided in an elbow configuration such as that illustrated in FIGS. 13 and 14 or as a straight-in type such as that illustrated in FIGS. 15 and 16 in which the conduit 11 is bent or deformed prior to insertion into the mounting component 13 and thereby forming an elbow as required.

An additional mounting assembly is included on the rear of the mounting flange of the embodiment illustrated in FIGS. 15 and 16, in order to minimise the chance that the spring clips 28 can pull the flange 26 into misalignment. In particular, a mounting assembly may be provided with a flange 37 that is substantially parallel to but spaced from the rear of the mounting flange 26 to balance any force applied by the spring clips 28 and to maintain the mounting flange 26 flush on the wall.

Figure 17:
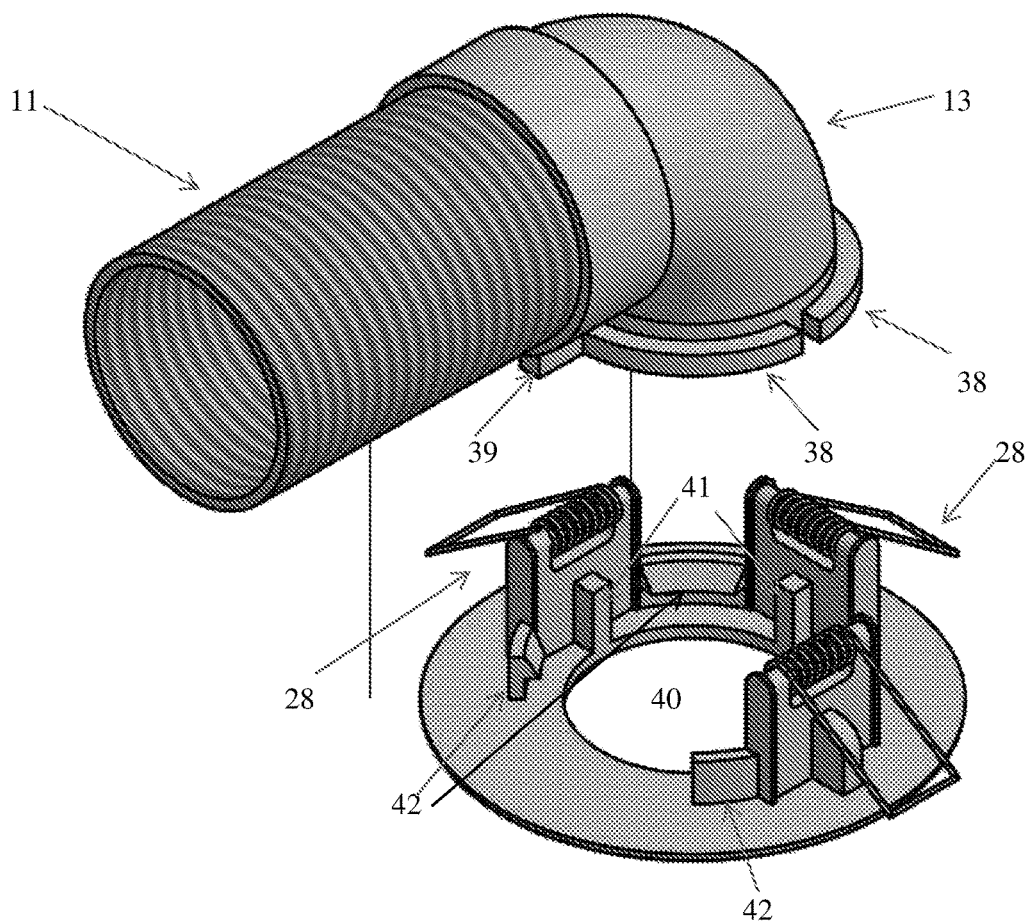
FIG. 17 is an exploded isometric view of an alternative configuration of the present invention with an elbow coupling overmolded onto the conduit and attachment to a corresponding mounting component.
Figure 18:
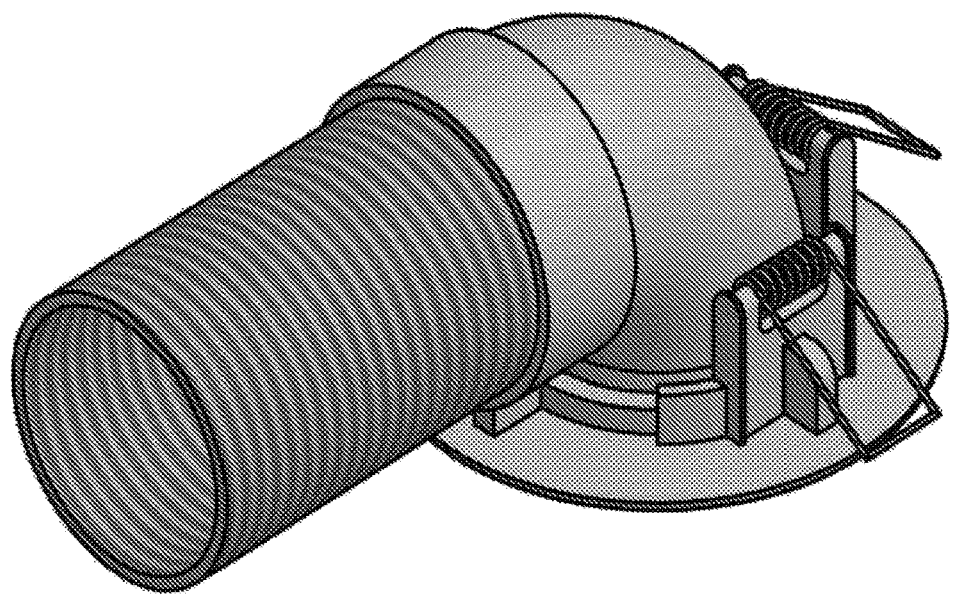
FIG. 18 is an isometric view of the configuration in FIG. 17 but attached.
Figure 19:
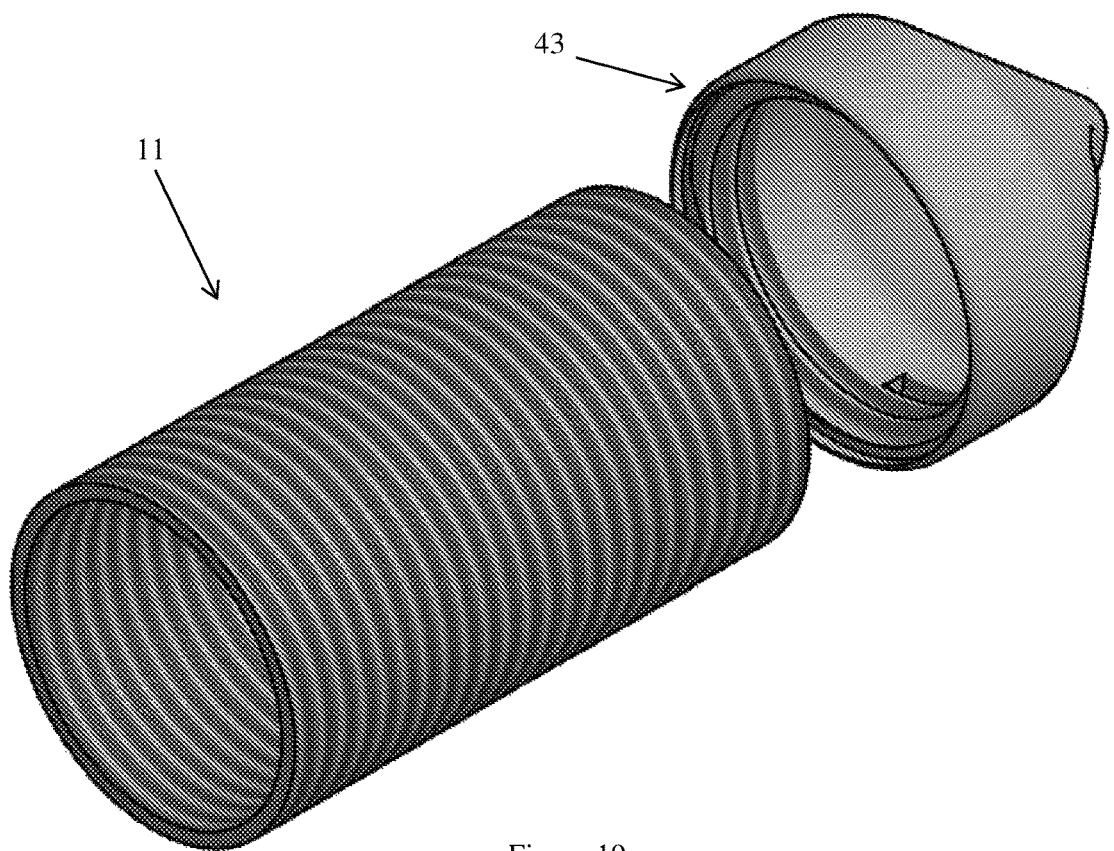
FIG. 19 is an exploded view of a tubular conduit and tapered leader according to a preferred embodiment of the present invention.
Figure 20:
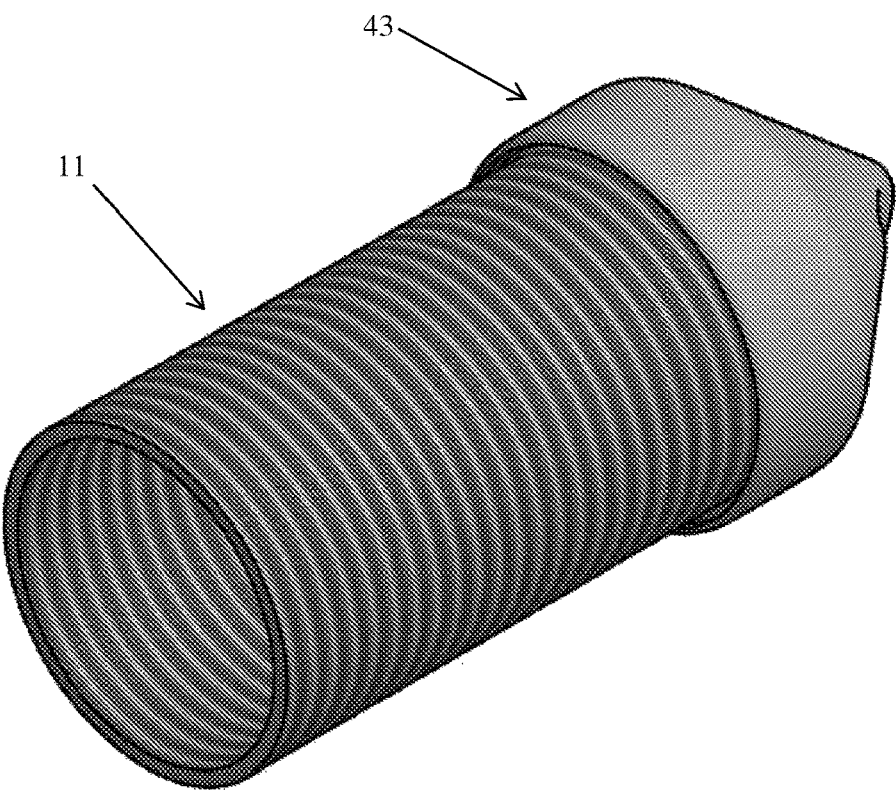
FIG. 20 is an isometric view of the tubular conduit and tapered leader illustrated in FIG. 19 in the use condition.

According to yet a further alternative embodiment illustrated in FIGS. 17 and 18, a coupling 12 may be provided that is overmoulded with the conduit 11 and the coupling 12 is engaged with a mounting component 13.

According to the embodiment illustrated in FIGS. 17 and 18, the coupling 12 is provided in an elbow configuration. The coupling 12 is provided with a number of radially extending flange portions 38 at or adjacent the end of the coupling 12 opposite the conduit 11. Three flange portions are provided, one which is approximately 180° about a portion of the coupling, and two other portions which are spaced from the first portion and from each other and extend approximately 90° about a portion of the coupling.

A bracing rib 39 is also provided.

The mounting component 13 of this particular embodiment includes a flange 26 to abut a wall surface and the spring clip assemblies 28 as discussed above spaced around a central opening 40. A number of guide posts 41 are provided, normally one adjacent each spring clip assembly in order to be received between the spaced apart flange portions 38 provided on the coupling 12 for alignment of the coupling 12 with the mounting component 13.

A number of latch arms 42 with abutment shoulders are provided on the mounting component 13 in order to engage with the flange portions 38. The latch arms 42 are slightly resilient to allow temporary deformation of the arms 42 during attachment and detachment of the coupling 12. Each latch arm 42 has an angled portion provided in order to force deformation of the latch arm 42 as the flange portion 38 passes. Thereafter, the abutment shoulders will typically abut a surface of the flange portions 38 in order to removably hold the coupling 12 to the mounting component 13.

Figure 21:
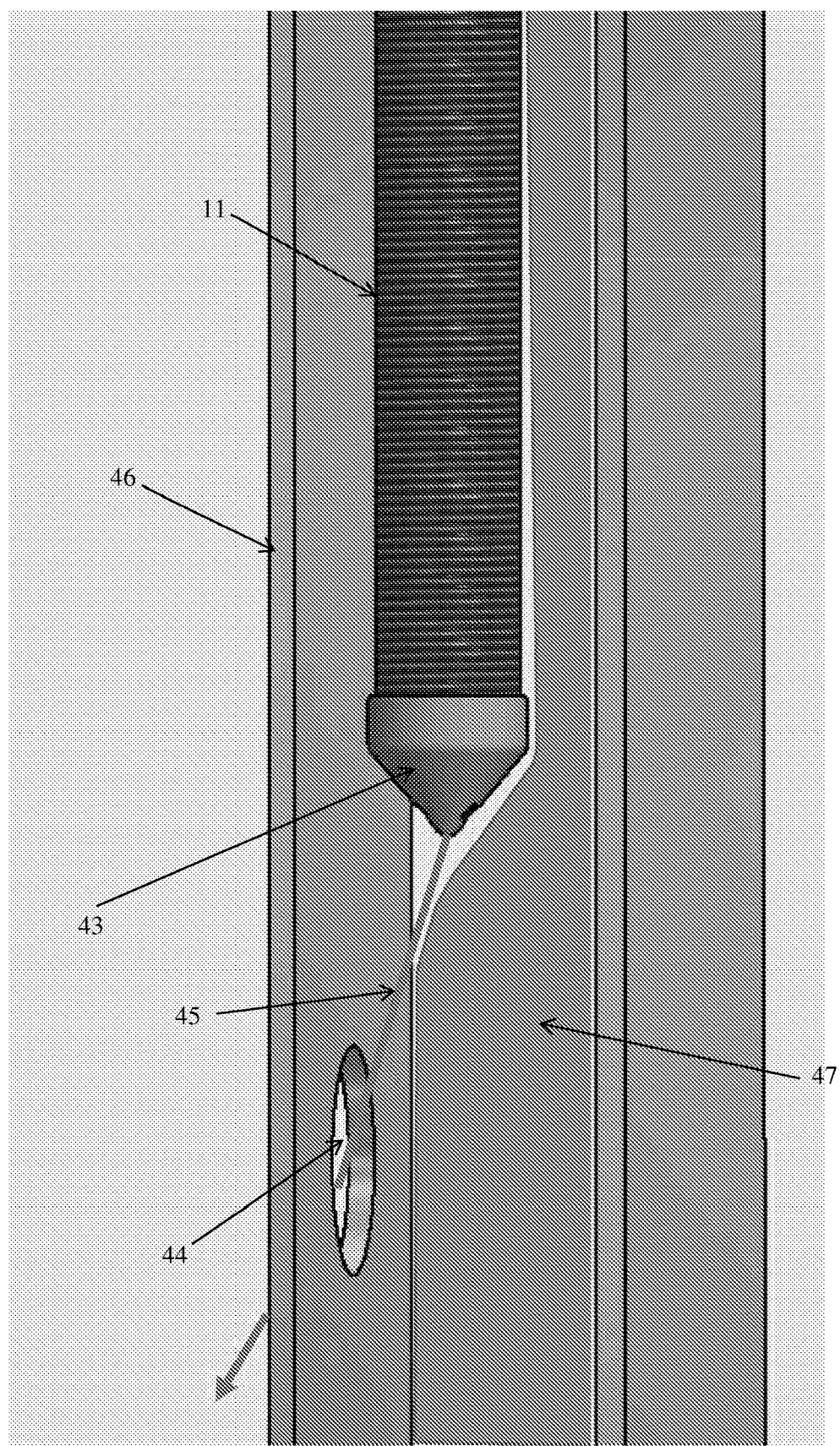
FIG. 21 is a schematic end elevation of a wall with the configuration illustrated in FIG. 20 in use.
Figure 22D:
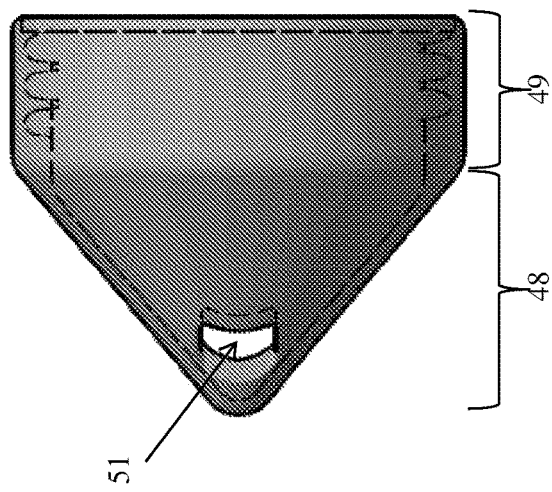
FIG. 22D is a side elevation view of the tapered leader illustrated in FIG. 22A.
Figure 22A:
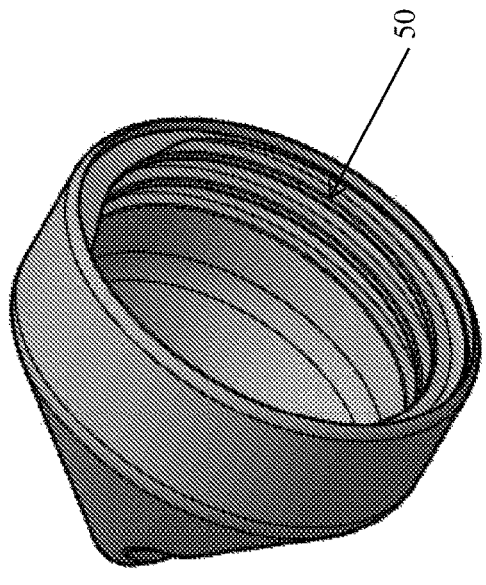
FIG. 22A is an isometric view of a tapered leader according to a first preferred embodiment.
Figure 22C:
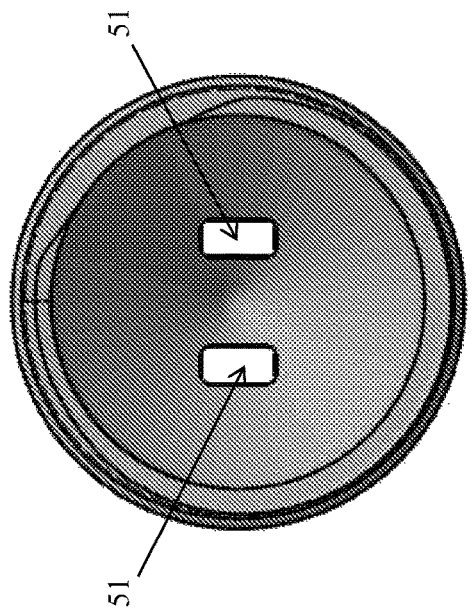
FIG. 22C is an end elevation view of the tapered leader illustrated in FIG. 22A.
Figure 22B:
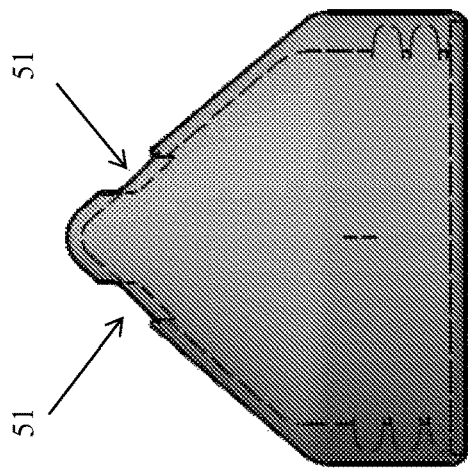
FIG. 22B is a plan view of the tapered leader illustrated in FIG. 22A.
Figure 23D:
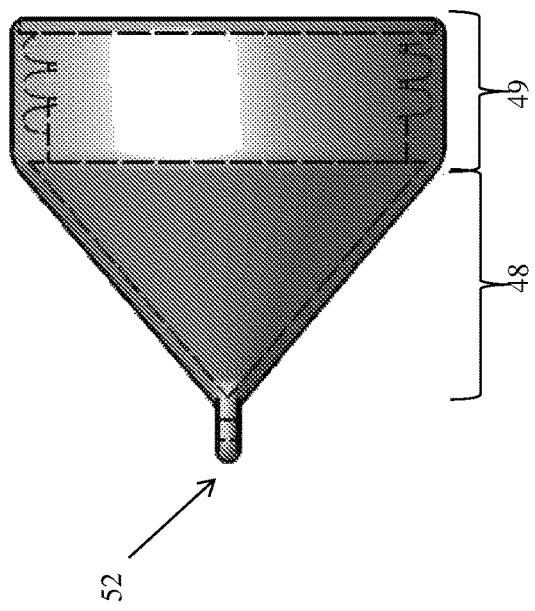
FIG. 23D is a side elevation view of the tapered leader illustrated in FIG. 23A.
Figure 23A:
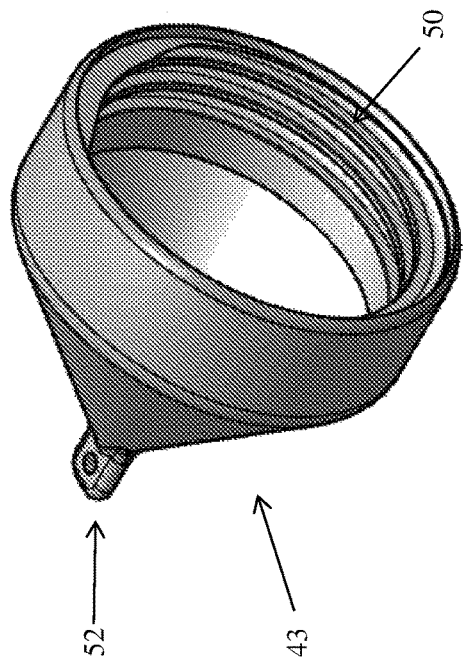
FIG. 23A is an isometric view of a tapered leader according to a second preferred embodiment.
Figure 23C:
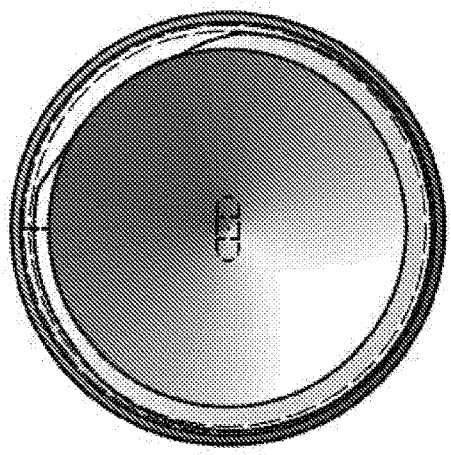
FIG. 23C is an end elevation view of the tapered leader illustrated in FIG. 23A.
Figure 23B:
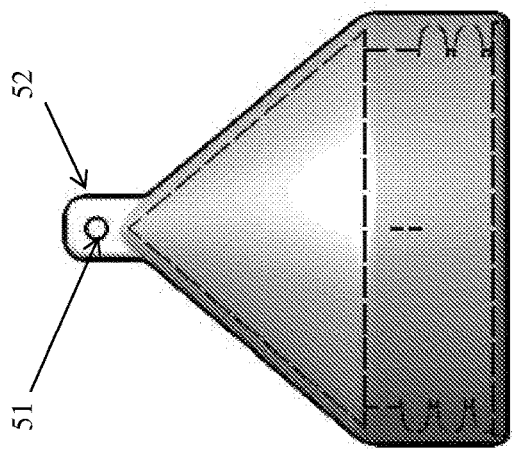
FIG. 23B is a plan view of the tapered leader illustrated in FIG. 23A.
Figure 24D:
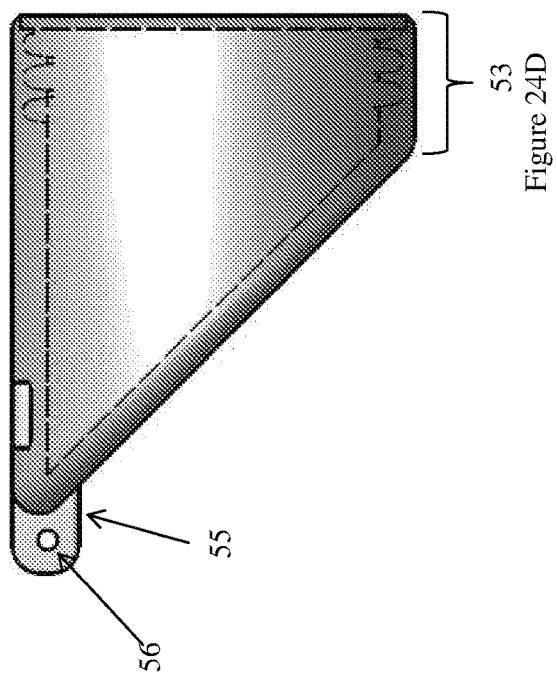
FIG. 24D is a side elevation view of the tapered leader illustrated in FIG. 24A.
Figure 24A:
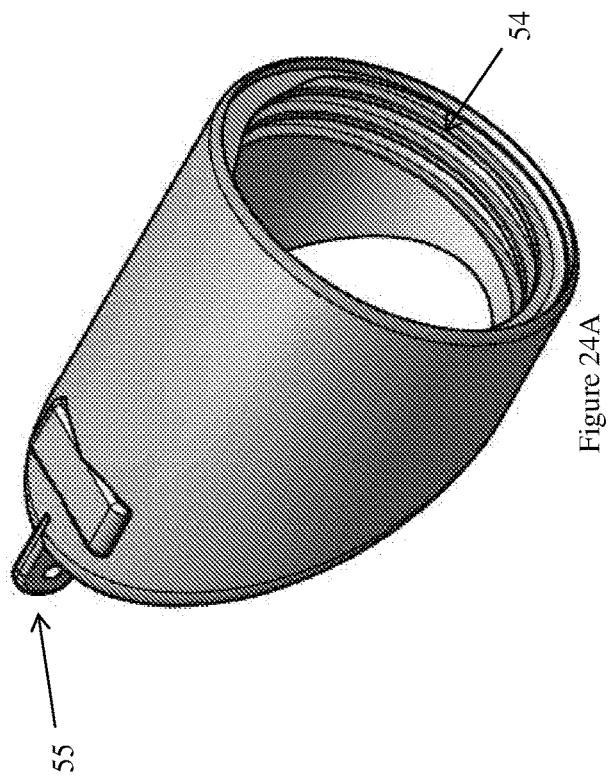
FIG. 24A is an isometric view of a tapered leader according to a third preferred embodiment.
Figure 24C:
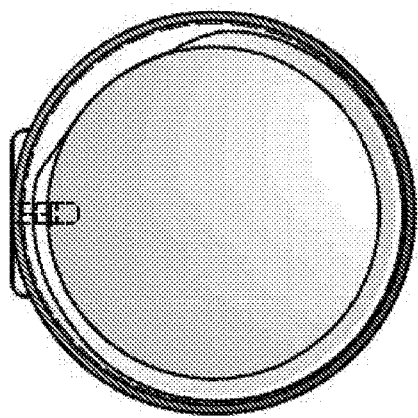
FIG. 24C is an end elevation view of the tapered leader illustrated in FIG. 24A.
Figure 24B:
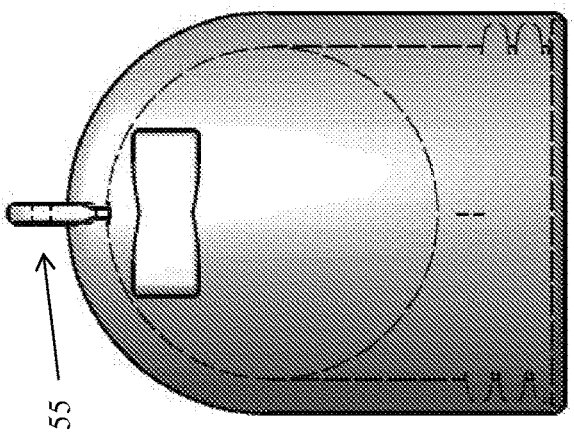
FIG. 24B is a plan view of the tapered leader illustrated in FIG. 24A.

The system of the preferred embodiment may further include a tapered leader 43 for removable attachment to or relative to the tubular conduit 11 during insertion into or through a wall cavity. This is particularly case in situations where the wall cavity is provided with internal installation between the wall facing panels which may cause issues with trying to feed the tubular conduit into or through the wall. This configuration and the use of the tapered leader 43 is illustrated in FIG. 21. The tapered leader 43 will typically be attached to the tubular conduit during insertion into or through the wall and can then be removed from the tubular conduit 11 in order to allow coupling of the tubular conduit 11 to a coupling 12 or directly to a mounting component 13.

As illustrated in FIG. 21, after drilling the top and bottom holes 44 in the wall for installation, a drawstring 45 is fed through from the top hole to the bottom hole 44 between the close wall panel 46 and the insulation 47. This can be achieved with many methods including using electricians "yellow tongue", pull rods or the like instead of a drawstring.

Once the conduit 11 has been trimmed to the correct length, the tapered leader 43 is screwed onto on end of the conduit 11. The drawstring 45 is then securely attached to the tapered leader 43 at the at the top hole end. The opposite end of the drawstring 45 i.e at the bottom hole 44, is then pulled continuously so as to pull the tapered leader 43 into the top hole and down inside the wall between the close wall panel 46 and the insulation 47. As the tapered leader 43 travels down the cone has the effect of pushing the insulation 47 away from the close wall panel 46, thus creating a void so the trailing conduit 11 can be pulled through between the insulation 47 and the close wall panel 46 as illustrated in FIG. 21. When the tapered leader 43 is visible at the bottom hole 44, it can be pulled through the bottom hole 44. The tapered leader 43 is then removed and the coupling 12 is screwed back on. The top and bottom mounting components 13 are then attached and installed as usual.

According to a first preferred embodiment illustrated in FIGS. 22A to 23D, the tapered leader 43 may include an at least partially conical forward portion 48. The tapered leader 43 of these embodiments includes a collar 49 to allow removable attachment to the tubular conduit 11 and as illustrated, the collar 49 is substantially cylindrical. The collar 49 internally threaded 50 to allow releasable engagement with the tubular conduit 11. An opening 51 is provided in a forward end or portion of the tapered leader 43. The opening 51 may be provided through a forward portion of the tapered leader 43 as illustrated in FIGS. 22A to 22D or in a forwardly extending tab 52 as illustrated in FIGS. 23A to 23D.

In an alternative configuration illustrated in FIGS. 24A to 24D, the tapered leader 43 may have an at least partially wedge shaped forward portion. The tapered leader 43 of this embodiment includes a substantially cylindrical collar 53 to allow removable attachment to the tubular conduit 11. The collar 53 is internally threaded 54 to allow releasable engagement with the tubular conduit. An opening 56 is provided in a forwardly extending tab portion 55.

Figure 26:
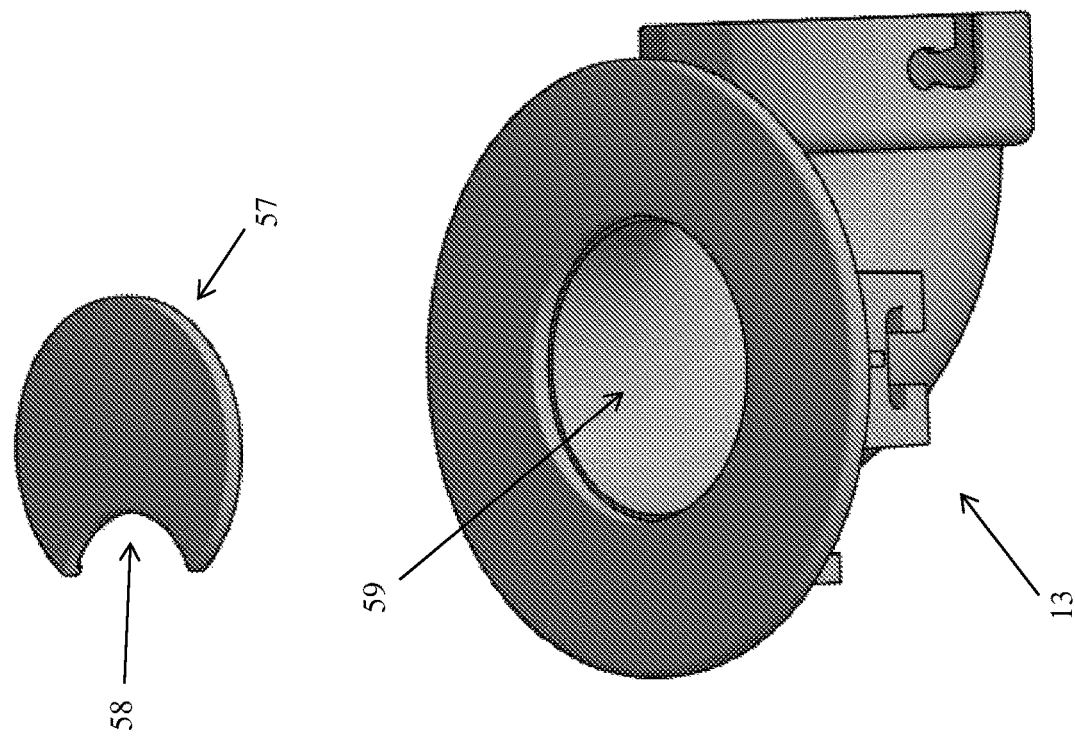
FIG. 26 is an isometric view of the configuration illustrated in FIG. 25 with the cover plate removed.
Figure 25:
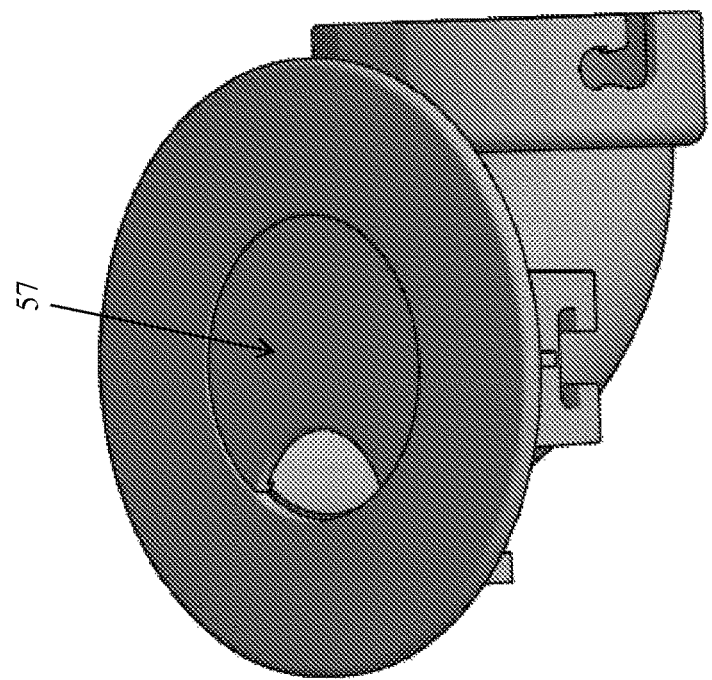
FIG. 25 is an isometric view of a preferred mounting component with a cover plate according to a preferred embodiment, in place.

It is also recognised that the system of the present invention might be used where the faceplates of the mounting component 13 might be visible i.e not behind the TV or cabinets for example. To improve the aesthetics, a clip-in cover plate 57 may be provided in order to at least partially close the opening 59 in the mounting component 13 to provide an aesthetically pleasing view to a user. Preferably, the cover plate 57 of the embodiment illustrated in FIGS. 25 and 26 simply attaches to or relative to the mounting component 13, preferably at least partially within the opening 59 in the mounting component 13 to partially close the opening in the mounting component 13. It is particularly preferred that the cover plate 57 be at least partially crescent shaped with a scalloped portion 59 as this will provide a covering for the majority of the opening 59 but leave a small portion of the opening uncovered to allow cables to extend therefrom as illustrated in FIG. 25.

Once the cables are fed through the in-wall conduit, it will be possible to clip the cover plate 57 into the opening 59, reducing the exposed mouth area to improve the aesthetics. The cover plate 57 is similar to those currently used in desk cable management (holes through the desks) but it is unique in this in-wall cable management solution.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

What is claimed is:

1. A method for installing an in-wall cable management system, the method comprising: providing a wall having a front surface and a back surface, the wall having formed therein an upper hole and a lower hole, each of which extends from the front surface through to the back surface with an internal wall surface provided therebetween, the upper hole being substantially aligned and spaced apart along a vertical axis from the lower hole, the method comprising providing an upper mounting component and a lower mounting component, each mounting component comprising an outer opening at a first end with an outer flange surrounding the outer opening and extending radially therefrom, the outer opening leading to a rearwardly extending tubular portion terminating at a second end, the second end having an inner opening configured to allow cables to extend therethrough, into the tubular portion and out from the outer opening, each mounting component further comprising an inner flange that extends radially away from the tubular portion and is substantially parallel to and inwardly spaced from the outer flange, each mounting component comprising a bracing rib disposed between the outer flange and the inner flange, each mounting component comprising a plurality of mounting arms extending rearwardly from the outer flange, each mounting arm having a spring clip extending therefrom, wherein a top end of a flexible, length adjustable and stretchable tubular conduit is secured to the second end of the tubular portion of the upper mounting component so as to provide for passage of cables through the tubular conduit and into the inner opening, the method comprising feeding a bottom end of the tubular conduit into and through the upper hole and allowing the bottom end of the tubular conduit to drop down vertically behind the wall, inserting the upper mounting component into the upper hole by depressing backwards the spring clips of the upper mounting component to enable the spring clips to clear the upper hole and pushing the upper mounting component into the upper hole until the spring clips of the upper mounting component rebound against the back surface of the wall to retain the upper mounting component in place as the outer flange of the upper mounting component overlies and abuts a portion of the front surface of the wall surrounding the upper hole, wherein the inner flange of the upper mounting component helps to maintain the outer flange of the upper mounting component flush on the wall, the bracing rib and mounting arms of the upper mounting component contacting the internal wall surface to further retain the upper mounting component in position within the upper hole, the method further comprising pulling the bottom end of the tubular conduit through the lower hole and securing the bottom end of the tubular conduit to the second end of the tubular portion of the lower mounting component so as to provide for passage of cables through the tubular conduit and into the inner opening of the tubular portion of the lower mounting component, the method further comprising inserting the lower mounting component into the lower hole by depressing backwards the spring clips of the lower mounting component to enable the spring clips of the lower mounting component to clear the lower hole and pushing the lower mounting component into the lower hole until the spring clips of the lower mounting component rebound against the back surface of the wall to retain the lower mounting component in place as the outer flange of the lower mounting component overlies and abuts a portion of the front surface of the wall surrounding the lower hole, wherein the inner flange of the lower mounting component helps to maintain the outer flange of the lower mounting component flush on the wall, the bracing rib and mounting arms of the lower mounting component contacting the internal wall surface to further retain the lower mounting component in position within the lower hole, wherein the tubular conduit is maintained in tension when stretched between the upper mounting component and lower mounting component, and wherein the spring clips of each respective mounting component, once the in-wall cable management system is installed, help to hold each mounting component securely in place due to eccentric tension caused by the tubular conduit.

2. The method for installing an in-wall cable management system of claim 1, wherein each of the top end of the tubular conduit and the bottom end of the tubular conduit is provided with a coupling, each coupling defining a body through which cables can extend, each coupling being attachable and detachable as required from the mounting components.

3. The method for installing an in-wall cable management system of claim 1, wherein each mounting component is provided in an elbow configuration such that the outer opening is oriented 90 degrees relative to the inner opening.

4. The method for installing an in-wall cable management system of claim 3, wherein the inner opening of the top mounting component is positioned directly vertically above the inner opening of the bottom mounting component and vertical tension between the mounting components is induced by tension provided by the tubular conduit.

5. The method for installing an in-wall cable management system of claim 1, wherein each mounting component is provided in an elbow configuration such that the tubular portion comprises a 90 degree bend.

6. The method for installing an in-wall cable management system of claim 5, wherein the tubular portion of each mounting component and the tubular conduit are both round in cross section and of substantially the same internal diameter.

7. The method for installing an in-wall cable management system of claim 1, the bottom end of the tubular conduit comprising a tapered leader removably attached thereto.

8. The method of claim 7, wherein the bottom end of the tubular conduit comprising the tapered leader is allowed to drop down vertically behind the wall and is pulled through the lower hole, the method further comprising removing the tapered leader from the bottom end of the tubular conduit before securing the bottom end of the tubular conduit to the second end of the tubular portion of the lower mounting component.

9. The method of claim 8, the tapered leader comprising a draw string attached thereto, wherein the drawstring is pulled through the lower hole so as to draw the tapered leader and bottom end of the tubular conduit out through the lower hole.

10. The method of claim 8, wherein insulation is disposed behind the wall and the tapered leader facilitates movement of the tubular conduit behind the wall, through the insulation and out through the lower hole.

11. The method for installing an in-wall cable management system of claim 1, wherein cables are fed into the upper mounting component, through the tubular conduit and out the lower mounting component, without use of fishing wires or rodding devices to pull the cables through.

12. The method for installing an in-wall cable management system of claim 1, wherein the tubular portion of each mounting component and the tubular conduit are both round in cross section and of substantially the same internal diameter.

13. The method for installing an in-wall cable management system of claim 1, wherein a clip-in cover plate at least partially covers the outer opening of either or both mounting components.

14. An in-wall cable management system configured to feed cables from an upper hole in a wall to a space behind the wall and through to a lower hole in the wall, the lower hole being substantially aligned and spaced apart along a vertical axis relative to the upper hole, the system comprising: a pair of mounting components, each mounting component being configured to be installed into a respective hole, each mounting component comprising an outer opening at a first end with an outer flange surrounding the outer opening and extending radially therefrom, the outer opening leading to a rearwardly extending tubular portion terminating at a second end, the second end having an inner opening configured to allow cables to extend therethrough, into the tubular portion and out from the outer opening, each mounting component further comprising an inner flange that extends radially away from the tubular portion and is substantially parallel to and inwardly spaced from the outer flange, each mounting component comprising a bracing rib disposed between the outer flange and the inner flange, each mounting component comprising a plurality of mounting arms extending rearwardly from the outer flange, the system further comprising a flexible, length adjustable and stretchable tubular conduit having a top end and a bottom end, wherein the top end of the tubular conduit is securable to the second end of the tubular portion of one mounting component and the bottom end of the tubular conduit is securable to the second end of the tubular portion of another mounting component so as to provide for passage of cables through the conduit and both mounting components when the conduit is assembled to both mounting components, wherein each mounting component is provided in an elbow configuration such that the outer opening is oriented 90 degrees relative to the inner opening, wherein the tubular portion of each mounting component and the tubular conduit are both round in cross section and of substantially the same internal diameter.

15. The system of claim 14, each mounting arm having a spring clip extending therefrom, wherein the spring clips are configured to rebound against a back surface of the wall to retain a respective mounting component in place as the outer flange of the respective mounting component overlies and abuts a portion of a front surface of the wall surrounding a respective hole.

16. The system of claim 14 further comprising a tapered leader removably attachable to the bottom end of the tubular conduit.

17. An in-wall cable management system configured to feed cables from an upper hole in a wall to a space behind the wall and through to a lower hole in the wall, the lower hole being substantially aligned and spaced apart along a vertical axis relative to the upper hole, the system comprising: a pair of mounting components, each mounting component being configured to be installed into a respective hole, each mounting component comprising an outer opening at a first end with an outer flange surrounding the outer opening and extending radially therefrom, the outer opening leading to a rearwardly extending tubular portion terminating at a second end, the second end having an inner opening configured to allow cables to extend therethrough, into the tubular portion and out from the outer opening, each mounting component further comprising an inner flange that extends radially away from the tubular portion and is substantially parallel to and inwardly spaced from the outer flange, each mounting component comprising a bracing rib disposed between the outer flange and the inner flange, each mounting component comprising a plurality of mounting arms extending rearwardly from the outer flange, the system further comprising a flexible and length adjustable tubular conduit having a top end and a bottom end, wherein the top end of the tubular conduit is securable to the second end of the tubular portion of one mounting component and the bottom end of the tubular conduit is securable to the second end of the tubular portion of another mounting component so as to provide for passage of cables through the tubular conduit and both mounting components when the tubular conduit is assembled to both mounting components, wherein each mounting component is provided in an elbow configuration such that the tubular portion comprises a 90 degree bend, wherein the tubular portion of each mounting component and the tubular conduit are both round in cross section and of substantially the same internal diameter.

18. The system of claim 17, each mounting arm having a spring clip extending therefrom, wherein the spring clips are configured to rebound against a back surface of the wall to retain a respective mounting component in place as the outer flange of the respective mounting component overlies and abuts a portion of a front surface of the wall surrounding a respective hole.

19. The system of claim 17 further comprising a tapered leader removably attachable to the bottom end of the tubular conduit.

20. The system of claim 17 wherein a clip-in cover plate at least partially covers the outer opening of either or both mounting components.

* * * * *